US012768777B2

(12) United States Patent
Brogger et al.

(10) Patent No.: US 12,768,777 B2
(45) Date of Patent: Oct. 20, 2026

(54) TAGGANT SYSTEMS WITH REMOTELY DETECTABLE SPECTRAL SIGNATURES

(71) Applicant: MICROTRACE, LLC, Minneapolis, MN (US)

(72) Inventors: Brian J. Brogger, Blaine, MN (US); Joseph T. Ippoliti, Woodbury, MN (US); Blake M. Roeglin, Minneapolis, MN (US); Brian T. Bustrom, Mounds View, MN (US)

(73) Assignee: MICROTRACE, LLC, Minneapolis, MN (US)

( * ) Notice: Subject to any disclaimer, the term of this patent is extended or adjusted under 35 U.S.C. 154(b) by 451 days.

(21) Appl. No.: 17/760,979

(22) PCT Filed: Sep. 17, 2020

(86) PCT No.: PCT/US2020/051229
§ 371 (c)(1),
(2) Date: Mar. 16, 2022

(87) PCT Pub. No.: WO2021/055573
PCT Pub. Date: Mar. 25, 2021

(65) Prior Publication Data

US 2022/0334054 A1 Oct. 20, 2022

Related U.S. Application Data

(60) Provisional application No. 62/903,334, filed on Sep. 20, 2019.

(51) Int. Cl.
*G01N 21/76* (2006.01)
*G01N 21/31* (2006.01)

(52) U.S. Cl.
CPC ............ *G01N 21/31* (2013.01); *G01N 21/76* (2013.01)

(58) Field of Classification Search
CPC ..... G02B 5/00; G02B 5/003; Y10T 428/2982; Y10T 428/2991; G01N 21/31; G01N 21/76
See application file for complete search history.

(56) References Cited

U.S. PATENT DOCUMENTS 3,904,642 A 9/1975 Mach et al.
4,005,111 A 1/1977 Mach et al.
(Continued)

FOREIGN PATENT DOCUMENTS

CN 101688072 A 3/2010
CN 103102735 A 5/2013
(Continued)

OTHER PUBLICATIONS

G. Pfaff, "Special Effect Pigments," in High Performance Pigments, Wiley-VCH, 2002, pp. 77-102 (Year: 2002).*
(Continued)

*Primary Examiner* — Hoa (Holly) Le
(74) *Attorney, Agent, or Firm* — Kagan Binder, PLLC

(57) ABSTRACT

The present invention provides spectral code strategies that allow spectral codes to be accurately and consistently deployed in a wide range of substrates and background situations. The present invention uses taggant particles with a multilayer structure that is able to produce a strong, consistent spectral signal that is resistant to background noise effects. The spectral output can be read remotely from a distance using multispectral, particularly hyperspectral, imaging techniques.

36 Claims, 15 Drawing Sheets

(56) References Cited

U.S. PATENT DOCUMENTS

| | | | | |
|---|---|---|---|---|
| 4,089,995 | A | 5/1978 | Ferro et al. | |
| 4,390,452 | A | 6/1983 | Stevens | |
| 5,059,245 | A * | 10/1991 | Phillips | C09C 1/0015 106/31.04 |
| 5,135,569 | A | 8/1992 | Mathias | |
| 5,172,936 | A | 12/1992 | Sullivan et al. | |
| 5,314,767 | A | 5/1994 | Bussard | |
| 5,380,695 | A | 1/1995 | Chiang et al. | |
| 5,603,259 | A | 2/1997 | Gross et al. | |
| 5,674,622 | A | 10/1997 | Burns et al. | |
| 5,710,197 | A | 1/1998 | Fischer et al. | |
| 5,781,316 | A | 7/1998 | Strahl et al. | |
| 5,829,789 | A | 11/1998 | Treleaven | |
| 6,153,123 | A | 11/2000 | Hampden-Smith et al. | |
| 6,165,384 | A | 12/2000 | Cooper et al. | |
| 6,165,592 | A | 12/2000 | Berger et al. | |
| 6,375,864 | B1 | 4/2002 | Phillips et al. | |
| 6,483,576 | B1 | 11/2002 | Gardner | |
| 6,492,093 | B2 | 12/2002 | Gaschler et al. | |
| 6,572,784 | B1 * | 6/2003 | Coombs | B82Y 10/00 427/218 |
| 6,632,783 | B1 | 10/2003 | Giblin et al. | |
| 6,676,852 | B2 | 1/2004 | Brown et al. | |
| 6,813,011 | B2 | 11/2004 | Gardner et al. | |
| 6,861,012 | B2 | 3/2005 | Gardner et al. | |
| 7,038,766 | B2 | 5/2006 | Kerns et al. | |
| 7,112,076 | B2 | 9/2006 | Wu | |
| 7,407,538 | B2 | 8/2008 | Jackson | |
| 7,497,972 | B2 | 3/2009 | Lichtenstein et al. | |
| 7,531,108 | B2 | 5/2009 | Hampden-Smith et al. | |
| 7,547,894 | B2 | 6/2009 | Agrawal et al. | |
| 7,674,532 | B2 | 3/2010 | Einhorn et al. | |
| 7,773,162 | B2 | 8/2010 | Nendel | |
| 7,903,281 | B2 | 3/2011 | Encrenaz et al. | |
| 8,034,436 | B2 | 10/2011 | Wei | |
| 8,159,657 | B2 | 4/2012 | Degott et al. | |
| 8,330,122 | B2 | 12/2012 | Smith et al. | |
| 8,360,323 | B2 | 1/2013 | Widzinski, Jr. et al. | |
| 8,362,130 | B2 | 1/2013 | Demartin Maeder et al. | |
| 8,822,954 | B2 | 9/2014 | Li et al. | |
| 8,828,271 | B2 | 9/2014 | Zhang | |
| 9,021,953 | B2 | 5/2015 | Barthram et al. | |
| 9,162,513 | B2 | 10/2015 | Pawlik et al. | |
| 9,342,999 | B2 | 5/2016 | Key | |
| 9,444,891 | B2 | 9/2016 | Bellis et al. | |
| 9,822,266 | B2 | 11/2017 | Okamoto et al. | |
| 9,878,574 | B2 | 1/2018 | Merchant | |
| 10,407,579 | B2 | 9/2019 | Yamanaka et al. | |
| 2002/0025490 | A1 * | 2/2002 | Shchegolikhin | B82Y 30/00 430/945 |
| 2004/0151827 | A1 * | 8/2004 | Argoitia | H01F 10/12 427/7 |
| 2005/0031838 | A1 | 2/2005 | Lagunowich et al. | |
| 2005/0100204 | A1 | 5/2005 | Afzal et al. | |
| 2005/0142342 | A1 | 6/2005 | Lutz et al. | |
| 2005/0178841 | A1 | 8/2005 | Jones, II et al. | |
| 2007/0076923 | A1 | 4/2007 | Chiu et al. | |
| 2007/0119951 | A1 | 5/2007 | Auslander et al. | |
| 2007/0205284 | A1 | 9/2007 | Ross | |
| 2008/0006615 | A1 | 1/2008 | Rosario et al. | |
| 2009/0033932 | A1 | 2/2009 | Gibson | |
| 2009/0141961 | A1 | 6/2009 | Smith et al. | |
| 2009/0251749 | A1 | 10/2009 | O'Boyle et al. | |
| 2010/0242793 | A1 | 9/2010 | Greb et al. | |
| 2010/0288943 | A1 | 11/2010 | Lambert | |
| 2011/0127763 | A1 | 6/2011 | Benenati et al. | |
| 2011/0283369 | A1 | 11/2011 | Green | |
| 2012/0003071 | A1 | 1/2012 | Yoshimoto et al. | |
| 2012/0133121 | A1 | 5/2012 | Bleikohlm et al. | |
| 2013/0153118 | A1 | 6/2013 | Friedrich | |
| 2015/0317923 | A1 * | 11/2015 | Edmonds | G06K 19/06103 235/494 |
| 2017/0032285 | A1 | 2/2017 | Sharma et al. | |
| 2018/0075685 | A1 | 3/2018 | Hussain et al. | |
| 2018/0197052 | A1 * | 7/2018 | Yanson | G06K 19/06037 |
| 2019/0236614 | A1 | 8/2019 | Burgin et al. | |
| 2019/0370514 | A1 | 12/2019 | Lawandy | |
| 2022/0258521 | A1 | 8/2022 | Brogger et al. | |
| 2022/0281259 | A1 | 9/2022 | Brogger et al. | |
| 2023/0298044 | A1 | 9/2023 | Brogger et al. | |

FOREIGN PATENT DOCUMENTS

| | | | |
|---|---|---|---|
| CN | 104830155 | A | 8/2015 |
| CN | 104877433 | A | 9/2015 |
| CN | 104893416 | A | 9/2015 |
| DE | 10 2010 026 782 | A1 | 1/2012 |
| EP | 0587178 | A2 | 9/1993 |
| JP | 2005338656 | A | 12/2005 |
| JP | 2008201065 | A | 9/2008 |
| JP | 2012044614 | A | 8/2012 |
| JP | 2012144614 | A | 8/2012 |
| JP | 2013196165 | A | 9/2013 |
| JP | 2015196819 | A | 11/2015 |
| KR | 10-1038035 | A | 6/2005 |
| KR | 10-1411063 | A | 8/2008 |
| KR | 20130140340 | A | 12/2013 |
| KR | 20170034600 | A | 3/2017 |
| WO | 02/103659 | A1 | 12/2002 |
| WO | 2015125224 | A1 | 8/2015 |
| WO | 2016052641 | A1 | 4/2016 |
| WO | 2017/201540 | A1 | 11/2017 |
| WO | 2020/025696 | A1 | 2/2020 |
| WO | 2020263744 | A1 | 12/2020 |
| WO | 2021/048539 | A1 | 3/2021 |
| WO | 2021041688 | A1 | 3/2021 |
| WO | 2021055573 | A1 | 3/2021 |
| WO | 2022/040304 | A1 | 2/2022 |
| WO | 2022/266208 | A2 | 12/2022 |

OTHER PUBLICATIONS

PCT/US22/33605, International Search Report and Written Opinion, ISA/US, date of mailing Dec. 2, 2022, total 6 pages.

PCT/US2021/046491, International Search Report and Written Opinion, mailed Aug. 12, 2021, 13 pgs.

PCT/US2020/051229, International Search Report and Written Opinion of the International Searching Authority, Feb. 4, 2021, 15 pgs.

PCT/US2020/038946, International Search Report and the Written Opinion of the International Searching Authority, Sep. 24, 2020, 12 pgs.

PCT/US2020/048215, International Search Report and Written Opinion of the International Searching Authority, Dec. 7, 2020, 9 pgs.

Ruff Lukas et al, "A Unifying Review of Deep and Shallow Anomaly Detection", Proceedings of the IEEE, vol. 109, No. 5, ( May 2021) pp. 756-795, XP011851623, ISSN 0018-9219, doi 10.1109/JPROC.2021.3052449.

Alberto Signoroni et al, "Deep Learning Meets Hyperspectral Image Analysis: A Multidisciplinary Review", J. Imaging, 5, 52 (2019), pp. 1-32; www.mdpi.com/joumal/ jimaging; doi 10.3390/ jimaging5050052.

Jinwon An et al, "Variational Autoencoder based Anomaly Detection using Reconstruction Probability", SNU Data Mining Center, Feb. 2015 Special Lecture on IE, pp. 1-18.

Sertac Arisoy et al, "Unsupervised Pixel-wise Hyperspectral Anomaly Detection via Autoencoding Adversarial Networks", arxiv.org, Cornell Univ. Library, Jan. 21, 2021, pp. 1-6, doi 10.1109/LGRS.2021. 3049711.

EP Appln No. 22825741.6, Extended European Search Report (ESSR), European Patent Office, Feb. 20, 2025, 10 pages.

* cited by examiner

TAGGANT SYSTEMS WITH REMOTELY DETECTABLE SPECTRAL SIGNATURES

PRIORITY CLAIM

This application claims priority to International Application No. PCT/US2020/051229, filed Sep. 17, 2020, which in turn claims the benefit of U.S. Provisional Patent Application No. 62/903,334 filed on Sep. 20, 2019, entitled "TAGGANT SYSTEMS WITH REMOTELY DETECTABLE SPECTRAL SIGNATURES," the disclosures of which are hereby incorporated by reference in their respective entireties for all purposes.

FIELD OF THE INVENTION

The present invention relates to spectral signature systems that encode spectral signature features into multi-layer taggant particles that allow one or more spectral signature to be detected and read remotely from a distance. In particular, the present invention uses multispectral (e.g., hyperspectral) imaging techniques to image a scene to detect and, if detected, to determine the location of the spectral signature (s) in the scene.

BACKGROUND OF THE INVENTION

Many documents, packages, consumer products, industrial products, raw materials, minerals, gemstones, product combinations, and other substrates are known for which it is useful to be able to identify and/or authenticate the substrates so that appropriate processes, identification, authentication, quality control, inventory practice, pricing, data harvesting, or the like can be carried out. Products liability protection also may benefit from identification and/or authentication strategies that allow a company to easily distinguish its own products from products of others. Any product susceptible to source confusion, counterfeiting, or grey market importation can benefit from identification and authentication strategies. Marketing strategies also may involve remotely gathering data from products being used so that marketing decisions, customer service, product performance, and the like can be managed or improved.

Marking substrates with taggants that produce detectable spectral signatures is a useful strategy to identify or authenticate substrates. One or more taggants may be used to encode the desired signature. The spectral signature or code is like a fingerprint to which a user can assign a particular meaning. Spectral signatures can be overt or covert and are used for a wide variety of applications. Substrates marked with a spectral signature can be easily distinguished from other substrates by "reading" the substrate with an appropriate reading device that can determine if a substrate produces the proper signature. Spectral codes also can be incorporated onto substrates even when bar codes or other form of machine readable or other indicia might be present.

Taggants have been incorporated into inks or other coating materials that are printed or otherwise coated onto a desired substrate. Such inks have been referred to in the industry as spectral inks. Taggant particles also may be compounded into materials used to form a substrate.

Generally, a taggant is a compound that emits spectral or optical characteristics in response to one or more designated triggering events. The optical characteristics of interest may be visible to the unaided human eye and/or only readable by machine, such as by a suitable detector. Examples of taggant compounds include luminescent compounds (e.g., fluorescent and/or phosphorescent compounds) that emit a luminescent optical characteristic in response to illumination with light of suitable intensity and wavelength(s); phosphor compounds that emit light in response to suitable illumination; light absorbing compounds that preferentially absorb or transmit certain wavelengths (e.g., infrared absorbing compounds that preferentially absorb infrared wavelengths); combinations of these; and the like.

A significant concern associated with taggant-based signatures concerns the ability to remotely detect signatures from a distance. Background noise tends to interfere too much when spectral signals from many conventional taggant systems are read from a distance. For example, many conventional taggant systems are vulnerable to ambient light, substrate colors and transparency, background colors, illumination sources, and the like. These background factors tend to cause detected spectral information to vary considerably from the intended spectral signature or even to cause the signature to be undetectable. This vulnerability means that a spectral signal produced by a conventional taggant system tends to be significantly impacted depending upon how and where the taggant system is deployed. Reading a signature remotely becomes more challenging as the distance between the reading device and the substrate increases.

The vulnerability to background noise means that a signature may need to be defined by relatively loose specifications to accommodate the background noise and thereby help to ensure that the signature can be detected under typical use conditions. This is quite undesirable. Not all use conditions can be predicted in advance, so even loose specifications may not be good enough. Further, relatively loose specifications increase the risk of false positives (e.g., a determination that a signature is present even when the signature is not present) and/or increase the risk that the signature will be easier to match by counterfeiters. Such a signature defined by less strict standards can be easier to fool or counterfeit, as a wider range of spectral features or background phenomena could provide an unintended match.

The practical reality is that the spectral signatures of many conventional taggant systems cannot be effectively read remotely from a distance. Instead, to minimize or avoid the influence of background noise, a compatible detector in conventional taggant systems more typically is placed into physical contact or close proximity with a substrate in order to read a spectral signature. Such detectors, often in the form of a spectrometer, also read only a small spot on the substrate at any one time. As a significant shortcoming, therefore, the user must know in advance where a taggant is deployed in order to quickly find the signature with a detector. Otherwise, the user may have to hunt and peck with the detector all over the substrate to locate the right spot that produces the signature. Many readings may need to be taken on a substrate before it can be reliably determined that the desired spectral signature is present or that a particular substrate does not incorporate the signature of interest.

Background noise in the detection environment is not the only factor that can cause signature signals to vary too much. Other factors that greatly impact signal variation relate to manufacturing and deployment consistencies. Difficulties in manufacture or deployment consistencies also may require that a spectral signature be defined by less strict tolerances to ensure that the more variable population of authentic signatures will pass muster.

Accordingly, there is a strong need for strategies that allow spectral signatures to be read remotely from a distance under circumstances in which the adverse effects of background noise are substantially avoided. Providing technical solutions to these challenges would allow signatures to be defined by much tighter specifications, reducing the risks of false positives and counterfeiting. Further, this would allow spectral signatures to be remotely detected from a distance without advance knowledge of whether and where a signature might be located in a scene.

SUMMARY OF THE INVENTION

The present invention provides spectral code strategies that allow spectral codes (also referred to herein as spectral signatures) produced by spectral taggants to be accurately and consistently deployed in a wide range of substrate and background situations. The taggant technology of the present invention is incorporated into taggant particles that produce spectral signatures with strong, uniform, consistent signal intensity. The taggant particles incorporate features that allow the signatures to be read remotely from a distance using imaging techniques (e.g., multispectral imaging techniques, including hyperspectral imaging) under circumstances in which the adverse effects of background noise are substantially avoided. The signature output of the taggant particles is strong, uniform, and consistent even when substrate features and other background effects vary considerably. The uniformity means that the signatures can be defined under tighter tolerances for enhanced security, resistance to false positives, and resistance to counterfeiters. This is contrasted to conventional taggant strategies under which spectral readings can vary considerably due to substrate variations, taggant concentration and coating thickness, background illumination, or other background noise.

There is no need to know the location of the taggant particles in advance. Imaging techniques can automatically detect, if present, and locate the taggant particles in an imaged scene. Each taggant particle may encode a single spectral signature or two or more spectral signatures. Different taggant particles may be used in combination to produce even more complex signatures.

The present invention achieves these advantages at least in part due to using taggant particles with a multilayer structure that is able to produce a strong, consistent spectral signal that is resistant to background noise effects. A further aspect of the present invention, therefore, is the discovery that taggants with such a multilayer structure are uniquely compatible with multispectral imaging techniques to allow accurate, remote reading of spectral signatures incorporated into the taggant particles.

In representative aspects, one or more taggants are dispersed in polymer matrices of one or more spectral taggant layers of the multilayer structure. The taggants can be loaded into the layers at a variety of different concentrations. Relatively high, consistent concentrations and ratios to help provide a strong spectral signal that multispectral imaging can detect from a distance. Opaque base layers underlie the spectral taggant layers to provide a solid, consistent background from which the spectral signal is intensely, uniformly, and consistently projected. The signal achieves such uniformity and consistency regardless of substrate type, reflectivity, absorptivity, transparency, or color. This greatly reduces the impact that background noise could otherwise have on producing and reading spectral signals. The taggant particles are resistant to counterfeiting and reverse engineering, because attempts to remove the taggants from the polymer matrices tends to destroy the taggants, making them hard to identify. In many embodiments, the particles are so small that it would be challenging as a practical matter to recover enough material to effectively reverse engineer the taggants even if an attempted recovery leaves some taggant material intact.

Multilayer taggant particles may be multi-sided. For example, one or more taggant layers may be formed on one or both sides of an opaque base layer (which may be formed of one or more sub-layers). The taggant layers and taggants on each side may be the same or different. If different, the taggant particle will tend to produce two distinct spectral codes that are individually detectable. Advantageously, a detection strategy can require both signatures on the same substrate to be present in order to confirm identification or authentication, for example. Merely mixing two different taggant materials into the same composition generally will not produce two distinct taggant signatures, because such a mixture tends to produce a composite signature instead. The composite signature is analogous to the result that occurs when two colors are mixed (e.g., mixing red and blue makes purple). The new color (composite signature) is produced, while the original colors (original two signatures) cannot be detected.

As another advantage, and subject to imaging device resolution, the particle density of taggant particles used to mark a substrate does not affect the consistency of the spectral signal. This consistency is further enhanced as the size distribution of the taggant particles being deployed is made to be narrower. If the concentrations and formulations of the taggant material(s) are the same, and subject to camera resolution, a lesser number of taggant particles within a given area will produce the same spectral signature as a larger number of the taggant particles within the given area. Subject to device resolution, an imaging device can detect spectral features of interest even from a single taggant particle per pixel. The reason for this behavior is that the signal properties are more dependent on the concentration of taggant material(s) within a taggant particle as opposed to the number of taggant particles per unit area on a substrate. Although not affecting the signal features, using a greater number of taggant particles per unit area would help make a signature easier to detect, while larger taggant particles would allow signature(s) to be more detectable from a greater distance.

Similarly, because the signal properties are more dependent on the concentration and formulation of taggant material(s) within taggant particles, particle size also does not affect the consistency of the spectral signal subject to camera resolution. If the concentrations and formulations of the taggant material(s) are the same, and subject to camera resolution, small taggant particles will produce the same spectral signature as larger particles. Although not affecting the signal features, single larger particles would help reading the signature from a greater distance depending on camera resolution.

As still yet another advantage, taggant particles of the present invention can be used to mark a wide range of substrates. The taggant particles may even be used to mark substrates in applications in which conventional taggants are not practically used. Examples of such applications include situations in which the taggant location(s) in a scene is not known, the taggant needs to be read from a distance, large areas or volumes need to be scanned (many conventional taggant strategies are limited to scanning each item individually), and the like. Specific examples of the kinds of substrates that can be marked with the taggant particles include, but are not limited to, marking bulk materials, marking a multitude of individual pieces (e.g., items on a conveyor, cargo, gemstones, minerals, casino chips, currency, personnel, vehicles, territory, crops, clothing or other inventory, people or animals, buildings, tools and equipment, supplies, documents, packaging, products, and the like.

In one aspect, the present invention relates to a multilayer, taggant particle, comprising: an opaque base layer comprising first and second opposed major faces; and at least a first spectral taggant layer provided on at least one of the first and second opposed major faces, wherein the first spectral taggant layer comprises one or more taggants dispersed in a light transmissive matrix, wherein the one or more taggants exhibit spectral characteristics associated with a spectral signature.

In another aspect, the present invention relates to a spectral signature system, comprising:

a multilayer taggant particle, wherein the multilayer taggant particle comprises:

an opaque base layer comprising first and second opposed major faces; and at least a first spectral taggant layer provided on at least one of the first and second opposed major faces, wherein the first spectral taggant layer comprises a light transmissive matrix and one or more taggants dispersed in the light transmissive matrix, and wherein the one or more taggant particles exhibit spectral characteristics;

a spectral signature associated with the spectral characteristics of the taggant particles;

a multispectral imaging device configured to capture multispectral image information of a scene; and a control system that uses information comprising the captured multispectral image information to determine an output indicative of a detection and/or a location of the spectral signature in the scene.

In another aspect, the present invention relates to a method of remotely detecting a spectral signature of a taggant system in a scene, comprising the steps of:

providing spectral signature that is pre-associated with the spectral characteristics of at least a first plurality of first, multilayer taggant particles, wherein each of the first multilayer taggant particles comprises:

an opaque base layer comprising first and second opposed major faces;

at least a first spectral taggant layer provided on at least one of the first and second opposed major faces, wherein the first spectral taggant layer comprises a light transmissive matrix and one or more taggants dispersed in the light transmissive matrix, and wherein the taggant particles exhibit the spectral characteristics;

capturing multispectral image information of a scene remotely from a distance; and using information comprising the captured multispectral image information to determine an output indicative of the detection and/or location of one or more spectral signatures in the scene.

DETAILED DESCRIPTION OF PRESENTLY PREFERRED EMBODIMENTS

The present invention will now be further described with reference to the following illustrative embodiments. The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Figure 1:
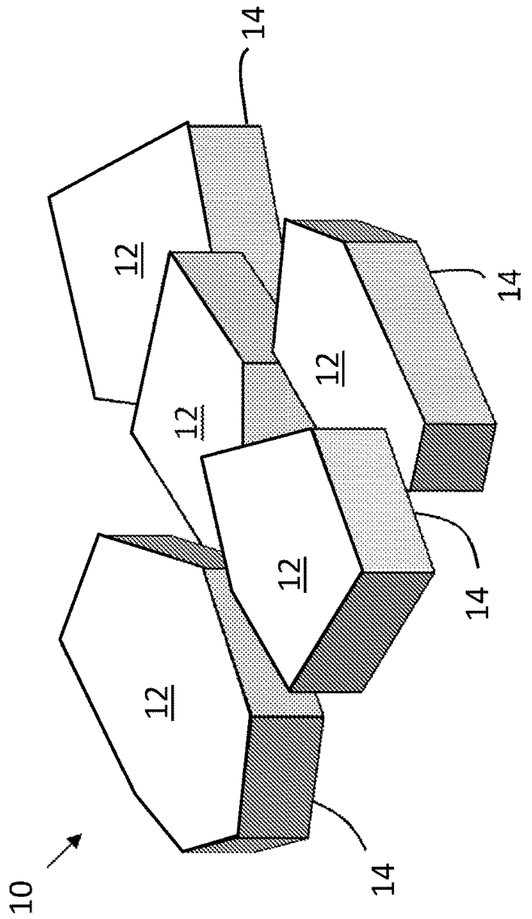
FIG. 1 schematically shows a perspective view of taggant particles of the present invention.
Figure 2:
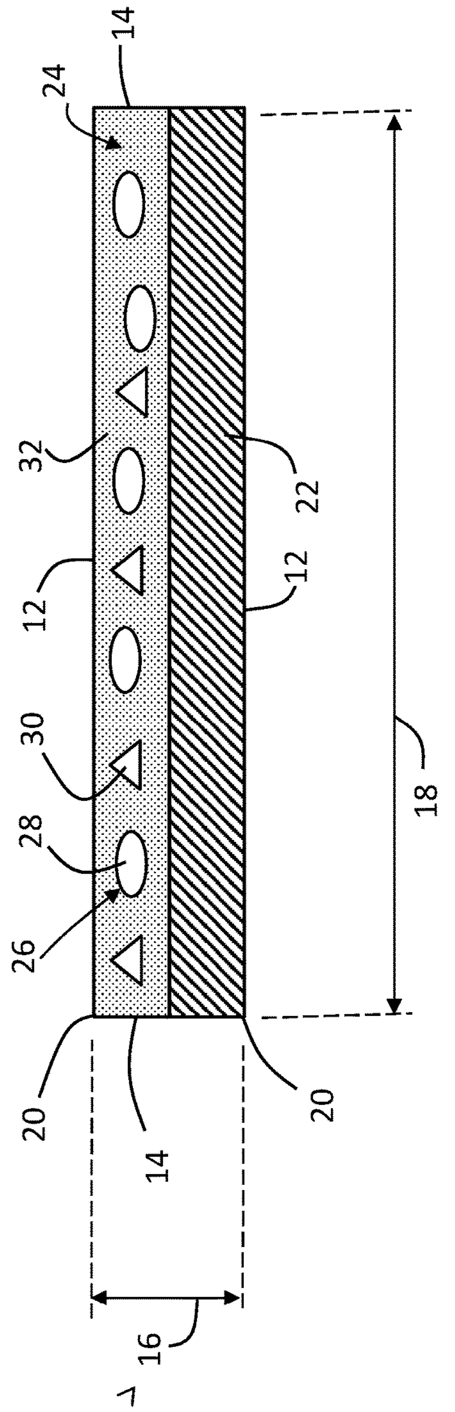
FIG. 2 schematically shows a side cross-section view of a typical taggant particle according to the present invention of FIG. 1.

A first embodiment of taggant particles 10 of the present invention is shown in FIGS. 1 and 2. Each taggant particle 10 has opposed, major faces 12 and a side 14 that interconnects the major faces 12 around the perimeter 20 of the faces 12. Using an illustrative manufacturing method described further below, the major faces 12 are parallel to each other such that the height 16 of the sides 14 between the major faces 12 is generally consistent among the taggant particles 10. The method may have a tendency to produce taggant particles 10 for which the perimeters 20 defining the major face shapes are somewhat irregular. However, the method shows how to use screening techniques to classify the manufactured taggant particles 10 into one or more desired size ranges for which the areas and widths 18 of the major faces 12 of the classified taggant particles 10 are fairly consistent. Generally, the screening techniques allow taggant particles 10 of the desired size range to be easily, quickly, and economically separated from a majority of and even substantially all other particles in a batch that are finer or coarser. A batch can thereby be classified into one or more different size groups so that taggant particles 10 of a suitable size can be selected from the resultant inventory depending on the desired end use.

For example, smaller sized taggant particles 10 may be more suitable in applications such as marking mined diamonds or other gemstones at one or more stages in the chain from mining to retail customer point of sale. Additionally, smaller taggant particles 10 also may be more suitable to incorporate into spray coatings. Supplemental illumination may be useful in some applications in order to make smaller taggant particles 10 easier to detect from a distance. Smaller taggant particles 10 also may be less visible to the unaided human eye, which may be desirable in some contexts where deployment is intended to be covert or where visible particles could unduly interfere with the visible appearance of a marked article. On the other hand, larger sized taggant particles 10 may be more suitable for marking cargo batches such as those described further below with respect to FIGS. 12 through 16. Larger taggant particles 10 also would tend to be easier to detect from a distance or if an imaging device has lower resolution at a given distance.

FIG. 2 shows the multilayer structure of a taggant particle 10 in more detail. Taggant particle 10 includes at least one opaque base layer 22 and at least one spectral taggant layer 24 provided on the opaque base layer 22. As used herein, “provided on” or “provide over” or similar terminology with respect to how one layer is provided with respect to another layer means that the one layer is either provided directly or indirectly on the other layer. A first layer is directly provided on a second layer when the first and second layers are in contact with each other. A first layer is indirectly provided on a second layer when one or more other layers are interposed between the first and second layer.

Opaque base layer 22 helps to provide a solid background against which the spectral signature or code incorporated into the spectral taggant layer 24 can be produced and read. The solid background helps to allow a better, stronger spectral signal to be read, particularly when the spectral signature is read remotely from a distance. Also important, the solid background helps to produce a consistent spectral output that is less vulnerable to substrate color, translucency, ambient light, and other background noise that could affect reading the output. In comparison tests, spectral signatures of particle embodiments including one or more base color layers would be easily read from a distance using multispectral/hyperspectral imaging techniques. In contrast, remote reading of signatures from comparison embodiments without such a base color layer would be substantially more difficult, requiring the signature tolerances to be opened up with a wider acceptance range. This increases the risk of false positives and makes counterfeiting easier. Perhaps, remote reading from a distance would not even be possible in some contexts due to a weaker signal and/or relatively greater background noise.

Spectral taggant layer 24 generally includes a taggant system 26 deployed in a light transmissive matrix 32, preferably in the form of an optically clear and/or tinted polymer matrix. Advantageously, taggant system 26 and other taggant system embodiments of the present invention (such as those described in FIGS. 3 to 6) produce spectral characteristics that can be detected using a suitable detector (also referred to in the industry as a reader). In some modes of practice, the detector may be a spectrometer or an imaging device. Preferred imaging devices are multispectral imaging devices, including those that have hyperspectral imaging capabilities.

For example, in an illustrative mode of practice, a spectral signature may be encoded in spectral characteristics that can be detected by an imaging device. Multispectral imaging techniques may be used to capture multispectral image information of a scene. Information including at least the captured multispectral image information from individual pixels or groups of pixels may be used to detect and locate the spectral signature in the image. An output may be provided that confirms whether the spectral signature is detected. An output may be provided that provides an image or video of the scene, in which the location(s) (if any) of the detected spectral signature are highlighted or otherwise identified.

Taggant system 26 generally includes one or more taggants. For purposes of illustration, taggant system 26 includes a combination of taggants 28 and 30 incorporated into the same spectral taggant layer 24. In other modes of practice, each of taggants 28 and 30 could be incorporated into separate spectral taggant layers if desired. Using a combination of two or more spectral taggants 28 and 30 offers many signatures strategies to be implemented. In some modes of practice, each of taggants 28 and 30 may produce an independent spectral output. Both outputs would need to be detected in order to confirm that the proper signature code is present. In other modes, combinations of taggants 28 and 30 may spectrally interact to produce a composite signature output that is not merely a cumulative output produced by either taggant 28 or 30 alone. Taggants 28 and 30 that interact to form a composite output are more secure, as the composite code may not be able to be reverse engineered from the individual spectral characteristics of the two taggants 28 and 30. A third party would have to uncover the specific combination, ratio of taggants, and the like in order to unlock and copy such a code. Since there are thousands and thousands of possible combinations, a third party attempting to misappropriate a composite code faces a significant reverse engineering challenge. Even more security can be obtained by using a composite spectral code derived from the interaction of three or more different taggants.

Deploying a taggant system 26 in polymer matrix 32 of particles 10 provides significant advantages. First, the taggant system 26 can be deployed within matrix 32 at a relatively high weight loading (e.g., 10 to 80 parts by weight or even more 50 to 120 parts by weight of the total weight of the spectral taggant layer 24 on a solids basis not including solvent) to produce a strong spectral signal that can be detected remotely from a distance. Yet, the taggant particles themselves can be deployed in a relatively dilute manner (e.g., under 10 weight percent, even under 5 weight percent, or even under 1 weight percent) in inks or other coating admixtures based on the total weight of the resins including solvent so that the resultant particle density on the marked substrate is quite low. Lower particle density may be helpful so that the deployed particles do not unduly alter the appearance of the marked substrate, if this is desired. The result is that deployment of a relatively small amount of taggant particles 10 can produce a very strong spectral signal capable of being read remotely from a distance. Even though a high weight loading of taggants might be used in the particles 10 themselves, so few particles 10 are used per unit area such that the overall usage of taggants is low per unit area of substrate being marked. In comparison, strategies that disperse lower loadings of taggants throughout a bulk coating solution may tend to use greater amounts of taggants overall per unit area of substrate being marked. Because taggant compounds often are expensive, the present invention counterintuitively offers the ability to produce a stronger taggant signal at lower cost.

Taggant particles 10 of FIGS. 1 and 2 are one-sided in the sense that a spectral taggant layer 24 is deployed on only one major face of the opaque base layer 22. This means that the spectral signature incorporated into particles 10 could be remotely read if a remote reading device can view one major face 12 of taggant particle 10 but not the other. Even with this limitation, the spectral signature of taggant particles 10 should still be able to be read remotely. Statistically, it can be expected that about half of the platelet-shaped particles 10 would be deployed with the spectral taggant layer 24 facing outward to be read by a detector. Although a greater number of and/or using larger of taggant particles generally does not impact the intensity of the spectral characteristics in many embodiments, using more or larger taggant particles would make it easier to capture image pixels that include the particles. The imaging camera, therefore, desirably has a sufficient resolution to detect such image pixels at desired distances. Other, two-sided embodiments of taggant particles are described below.

It may be possible that some portion of the particles 10 can be incorporated sideways in the matrix 32 and read, but the edge facing a detector may not produce spectral characteristics with a desired intensity. To help ensure that the particles tend to face the detector in order for spectral characteristics with a desired intensity to be detected, taggant particles 10 desirably have a platelet shape as described further below. The particle manufacturing method described below shows how platelet shaped particles may be prepared from a laminated, multilayer sheet that is ground and sized to provide the desired particles 10. Other processes can prepare such multilayer particles using other techniques such as coating, lamination, combinations of these, and the like.

Figure 3:
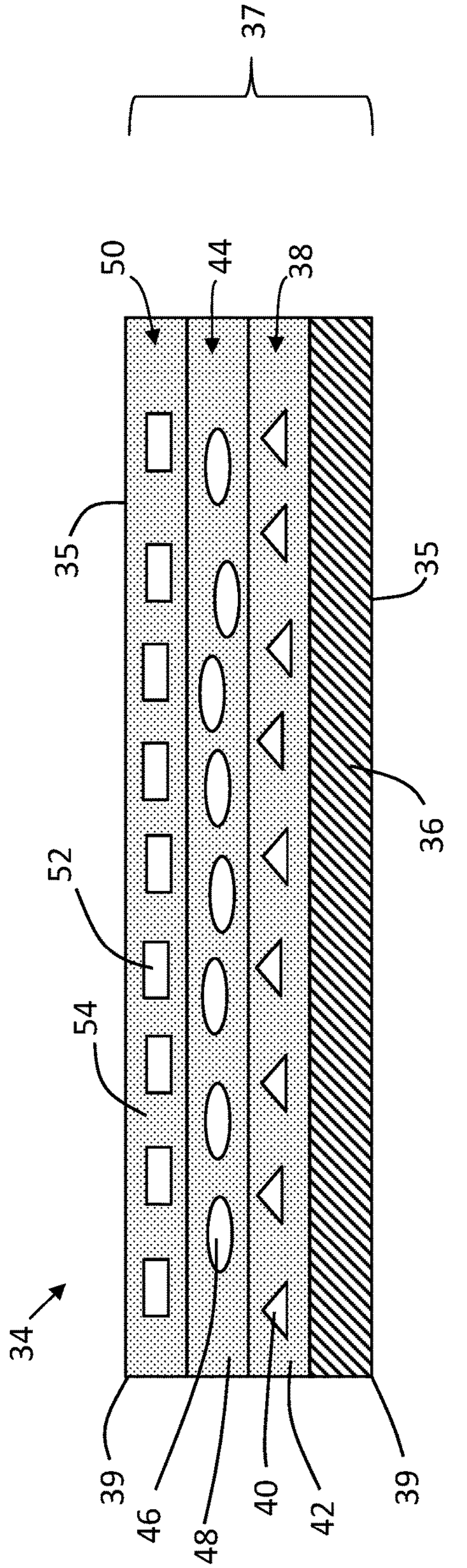
FIG. 3 schematically shows a side cross-section view of an alternative embodiment of a taggant particle of the present invention.

FIG. 3 shows an alternative embodiment of a platelet-shaped, one-sided taggant particle 34. In a manner similar to taggant particles 10 of FIGS. 1 and 2, taggant particle 34 also has opposed and parallel major faces 35 and a side 37 that interconnect the major faces 35 around the perimeter of the major faces 35. Using an illustrative manufacturing method described further below, the major faces 35 are generally parallel to each other so that the height of the sides 37 between the major faces 35 is generally uniform. The method may have a tendency to produce taggant particles 34 for which the perimeters 39 defining the major face shapes are somewhat irregular. In contrast to taggant particle 10 of FIGS. 1 and 2, taggant particle 34 deploys taggant material in a stack of multiple spectral taggant layers 38, 44, and 50 provided on opaque base layer 36. Spectral taggant layer 38 includes taggant 40 dispersed in polymer matrix 42. Spectral taggant layer 44 includes taggant 46 dispersed in polymer matrix 48. Spectral taggant layer 50 includes taggant 52 dispersed in polymer matrix 54.

Figure 4:
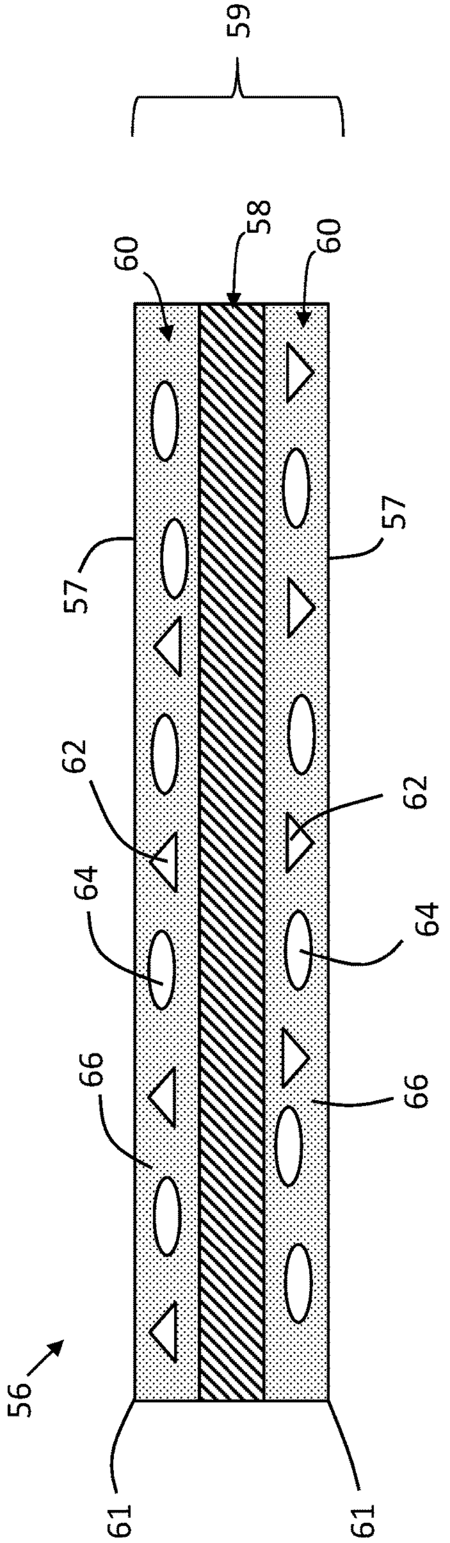
FIG. 4 schematically shows a side cross-section view of an alternative embodiment of a taggant particle of the present invention.

FIG. 4 shows an alternative embodiment of a platelet-shaped, two-sided taggant particle 56. In a manner similar to taggant particles 10 of FIGS. 1 and 2, taggant particle 56 also has opposed and parallel major faces 57 and a side 59 that interconnect the major faces 57 around the perimeter of the major faces 57. Using an illustrative manufacturing method described further below, the major faces 57 are generally parallel to each other so that the height of the side 59 between the major faces 35 is generally uniform. The method may have a tendency to produce taggant particles 56 for which the perimeters 61 defining the major face shapes are somewhat irregular. In contrast to taggant particle 10 of FIGS. 1 and 2, taggant particle 56 deploys spectral taggant layer 24 on both sides of the opaque base layer 22. This allows a reading device to be able to read a spectral signature from either side of taggant particle 56. Taggant particle 56 should provide a strong spectral signature to be read remotely, because most of the deployed particles 56 would present one readable major face 12 or the other toward the remote detection device.

Figure 5:
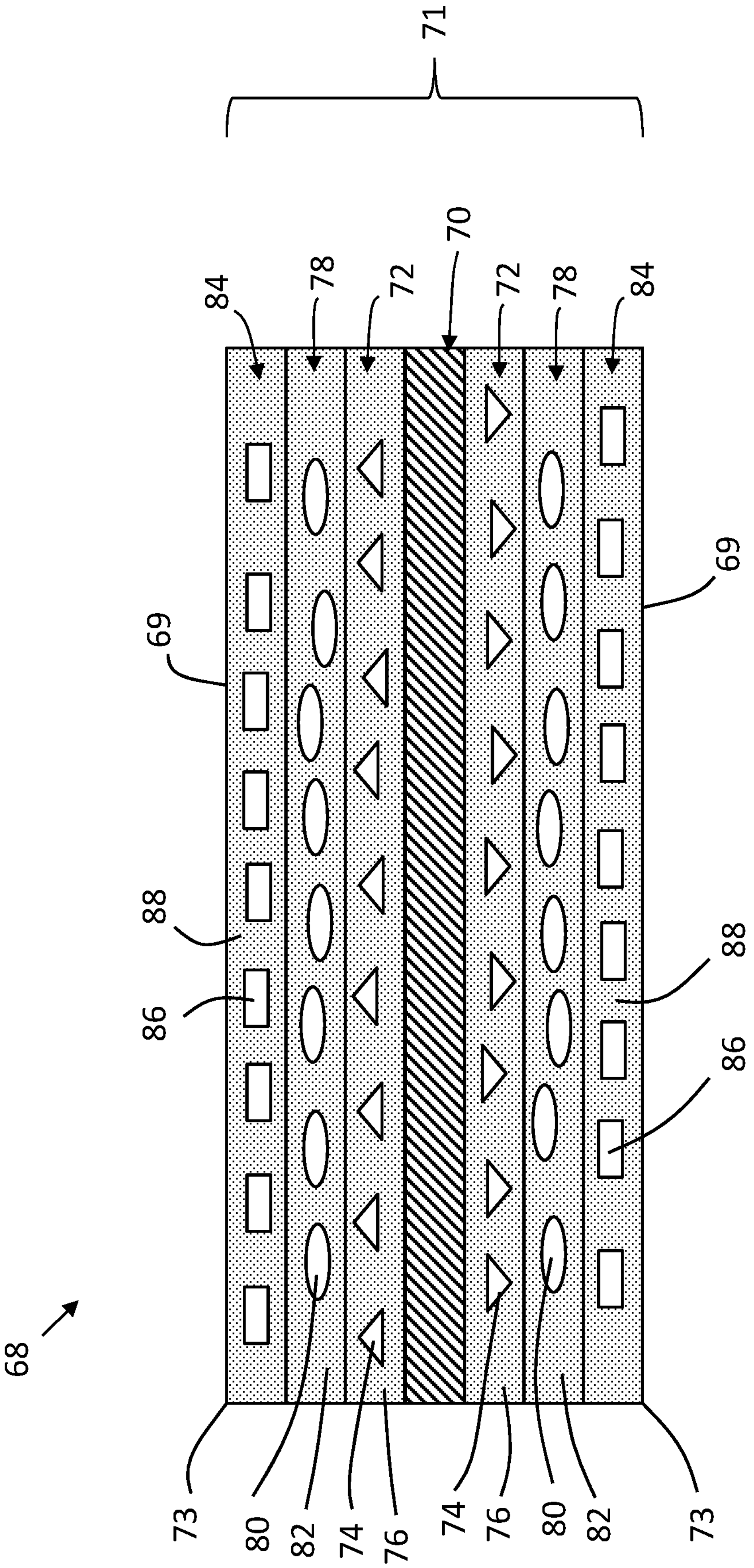
FIG. 5 schematically shows a side cross-section view of an alternative embodiment of a taggant particle of the present invention.

FIG. 5 shows an alternative embodiment of a platelet-shaped, two-sided taggant particle 68. In a manner similar to taggant particles 10 of FIGS. 1 and 2, taggant particle 68 also has opposed and parallel major faces 69 and a side 71 that interconnect the major faces 69 around a perimeter 73 of the faces 69. Using an illustrative manufacturing method described further below, the major faces 69 are generally parallel to each other so that the height of the side 71 between the major faces 69 is generally uniform. The method may have a tendency to produce taggant particles 68 for which the perimeter 73 defining the major face shapes are somewhat irregular. In contrast to taggant particle 34 of FIG. 3, the taggant particle 68 deploys spectral taggant layers 38, 44, and 50 on both sides of the opaque base layer 36. This allows a reading device to be able to read a spectral signature from either side of taggant particle 68. Having taggant material on both sides increases the likelihood that taggant faces are perpendicular to the detector in order to produce spectral characteristics of a desired intensity.

Figure 6:
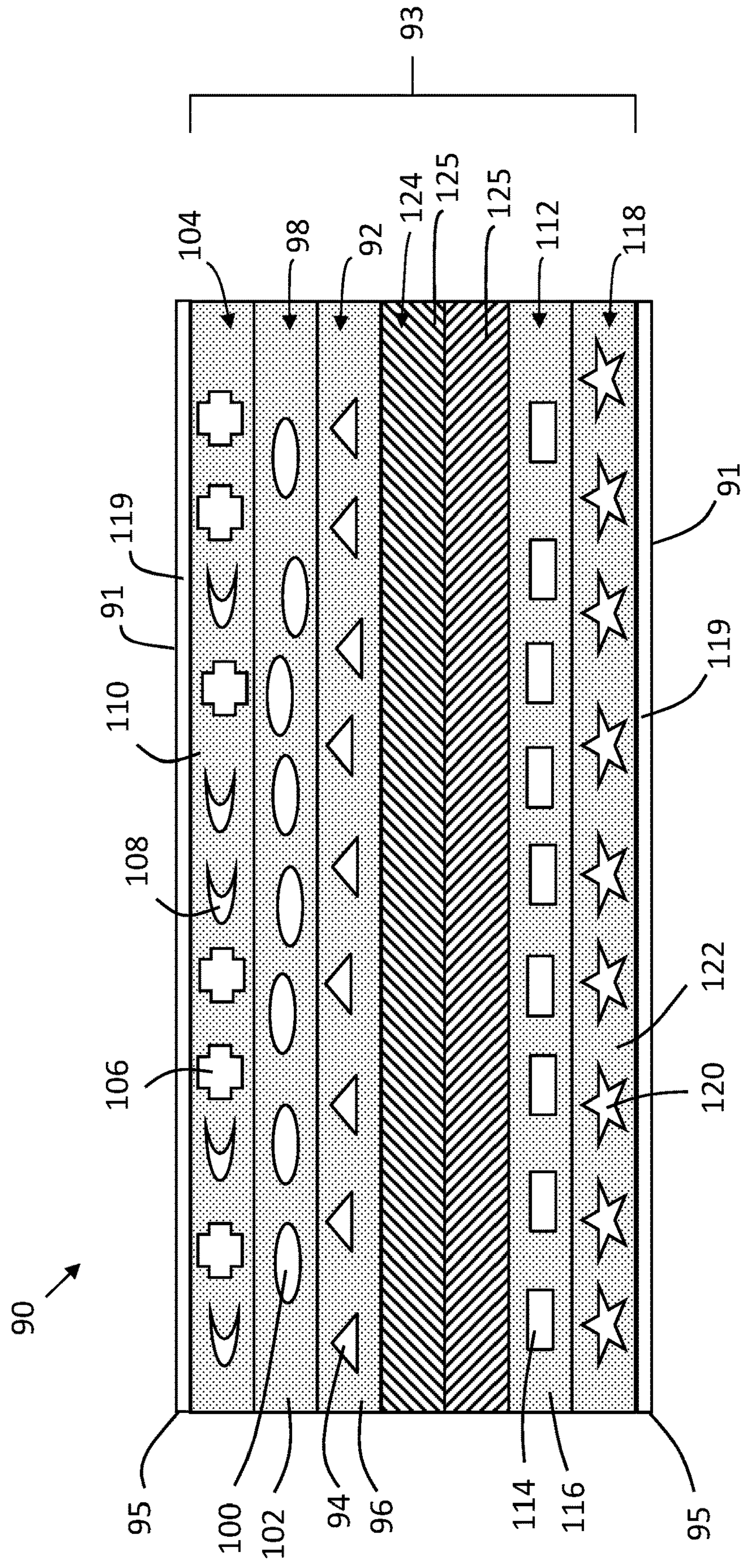
FIG. 6 schematically shows a side cross-section view of an alternative embodiment of a taggant particle of the present invention.

FIG. 6 shows an alternative embodiment of a platelet-shaped, two-sided taggant particle 90 that incorporates different spectral signatures on each side. To accomplish this, spectral taggant layers 92 (including taggant 94 in polymer matrix 96), 98 (including taggant 100 in polymer matrix 102) and 104 (including taggants 106 and 108 in polymer matrix 110) are deployed on one side of opaque base layers 124. In the meantime, spectral taggant layers 112 (including taggant 114 in polymer matrix 116) and 118 (including taggant 120 in polymer matrix 122) are deployed on the other side of opaque base layers 124. The result is that each side of taggant particle 90 encodes a different spectral signature. Both signatures would need to be detected in order to confirm the proper overall signature code is present.

In a manner similar to taggant particles 10 of FIGS. 1 and 2, taggant particle 90 also has opposed and parallel major faces 91 and a side 93 that interconnect the major faces 91 around a perimeter 95 of the faces 91. Using an illustrative manufacturing method described further below, the major faces 91 are generally parallel to each other so that the height of the side 93 between the major faces 91 is generally uniform. The method may have a tendency to produce taggant particles 90 for which the perimeter 95 defining the major face shapes are somewhat irregular.

Note that taggant particle 90 includes two opaque sub-layers 125 that collectively provide an opaque base layer 124. This provides one strategy to increase the opacity of the opaque foundation underlying the spectral taggant layers. This helps to further isolate the signature on one side of taggant particle 90 from the other. This allows each signature to be read with less cross-talk from the other signature.

FIG. 6 also shows an optional light transmissive, tinted layer 119 that may be provided on one or both sides of taggant particle 90. Each tinted layer 119 may be tinted in order to alter the visual appearance of the faces 91. Each tinted layer 119 may be tinted in the same manner or may be tinted differently. The tinted effect may be visible to the unaided human eye or may only be visible under a certain kind of triggering illumination, such as ultraviolet light, infrared light, or, the like. Alternatively or in addition to tinted layers 119, tinting effects may be incorporated into one or more of the spectral taggant layers 92, 98, 104, 112, and/or 118. Similar tinted layers or tinting effects also may be used in a similar manner in the embodiments shown in FIGS. 1-5 or any other embodiments of taggant particles of the present invention.

FIGS. 1-6 show different, exemplary embodiments of taggant particles of the present invention. Each of the taggant particle embodiments of these figures generally includes at least one spectral taggant layer provided on one or both major surfaces of one or more opaque base layers. The spectral taggant layers incorporate a taggant system including one or more taggant materials that produce a spectral output that encodes a spectral signature. The opaque base layers in FIGS. 1-6 and other embodiments of taggant particles of the present invention provide a foundation underneath the spectral taggant layers in a manner effective to help make a spectral output more consistent and more intense while being more resistant to background noise. The following discussion describes the opaque base layers and spectral taggant layers of the taggant particle embodiments of FIGS. 1 to 6, as well as other taggant particle embodiments, in more detail.

In various embodiments, the opaque base layers and the spectral taggant layers may be formulated in various ways. For example, opaque base layers useful in any embodiments of the present invention are often formulated to provide a polymer matrix presenting a single, neutral, opaque, color such as an opaque white or grey, but these can be formulated to display one or more other colors or other surface characteristics, if desired. Opaque white or grey, preferably white, embodiments of the opaque base color layers are more preferred to help generate higher intensity, consistent spectral output that is less vulnerable to background noise and that can be read remotely from a distance.

To more effectively serve as a solid, opaque background for one or more spectral taggant layers, highly reflective opaque base layer embodiments are avoided. Higher reflectivity could cause opaque base layers to reflect too much incoming light that might interfere unduly with producing and/or reading the spectral signature by a remote reading device. For example, tests showed that higher gloss metallic finishes on the surface of opaque base layers could interfere with the ability to remotely read a spectral signature using hyperspectral imaging device. In particular, the intensity of the signal was observed to be reduced, and background noise tended to have a greater impact. It is believed that the high reflectance of the high reflectivity metallic surfaces in practical effect created additional background noise that interfered with reading the spectral output.

A preferred formulation of opaque base layers includes at least one white pigment such as titanium dioxide dispersed in a polymer matrix, wherein the titanium dioxide is present in a sufficient weight loading to render the opaque base layers opaque. An exemplary formulation may include 35 parts by weight to 70 parts by weight percent titanium dioxide based on 50 to 100 parts by weight of polymer matrix (on a solids basis excluding solvent) in which the titanium dioxide is incorporated. Generally, opacity tends to increase with increasing weight loading. However, the mechanical properties of the formulation may be impaired if the weight loading is too high.

In addition to increasing the weight loading of titanium dioxide in the opaque base layer, additional strategies may be practiced to increase opacity. One strategy incorporates two different kinds of white pigment into the layers. One pigment, such as a titanium dioxide, has a relatively coarse particle size, while the other pigment, such as a different titanium dioxide or other pigment, has a relative finer particle size (or vice versa). The finer particles are able to fill the interstitial regions between the larger particles to enhance opacity. As another strategy, a thicker opaque base layer may be used. In other embodiments, two or more opaque sub-base layers may be used.

In many embodiments, both the opaque base layers and the spectral taggant layers incorporate a light transmissive, polymer matrix. The polymer matrix of these layers may be independently formed from one or more monomers, oligomers, and/or thermoplastic and/or thermosetting polymers. Illustrative monomers and/or oligomers comprise co-reactive functionality to allow polymerization and optionally cross-linking to form the polymer matrix. Some monomers and oligomers include free radically reactive functionality (such as carbon-carbon double bonds) that are polymerizable or crosslinkable using UV light, electron beam energy, thermal energy, acoustic energy, radiant energy, or the like.

Examples of such polymers include polyesters, polyurethanes, polyethers, olefins, phenolic resins, polyamides, polyimides, poly(meth)acrylates, polystyrenes, polystyrene-olefin copolymers, melamine formaldehyde resins, epoxies, polyvinyl chlorides, fluoropolymers, combinations of these, and the like. Thermosetting formaldehyde resins are preferred, as these are hard, durable, and can cure by heat and/or a suitable chemical crosslinking agent. Polymer matrices of these types also may be formed from monomer and/or oligomer precursors in situ.

The one or more polymers may have a weight average molecular weight over a wide range. In exemplary embodiments, polymers with a weight average molecular weight in the range from 2,000 to 150,000 would be suitable. Weight average molecular weight may be determined using light scattering according to ASTM D4001-13, Standard Test Method for Determination of Weight-Average Molecular Weight of Polymers by Light Scattering, ASTM International, West Conshohocken, PA, 2013.

The one or more polymers used to form the polymer matrices in the opaque base layers and/or the spectral taggant layers may be aromatic or aliphatic. For outdoor applications in which the taggant particles may be exposed to sunlight, aliphatic or other ultraviolet resistant embodiments are desirable.

If a stack of two or more spectral taggant layers is used, the same or similar polymer matrix may be used in each to avoid undue index of refraction effects as light travels through the layers. Additionally, in order to allow the one or more taggants in the one or more spectral taggant layers to produce a spectral output that can be read by an adjacent or remote detector, the polymer matrices of the spectral taggant layers desirably are light transmissive. Light transmissive means that a polymer matrix may be sufficiently transparent, translucent, or tinted to avoid adversely impacting the ability to detect the spectral output of the spectral taggant layers in a manner effective to allow determination of whether the proper spectral code is encoded in the output. Suitable light transmissive materials are generally viewed as colorless polymers, but in practice these may be tinted or otherwise have pale colors such as a pale amber color.

A polymer matrix used to form a spectral taggant layer or other coating or layer used in the taggant particles will be deemed to be light transmissive if a cured, 2 mil (0.05 mm) coating of the matrix material when formed over an underlying white reference surface (from LENETA paper) does not change the intensity of the reflectance spectrum of the reference surface at wavelength 960 nm by more than 70% (which may be an increase or decrease), preferably no more than 50% as compared to the uncoated reference surface that does not include the coated material when using a SPECIM IQ hyperspectral camera to obtain spectral data.

The weight loading of one or more taggants in the polymer matrix of a spectral taggant layer can be selected over a wide range. Generally, using a greater weight loading of the one or more taggants tends to provide a stronger spectral signal. Hence, a sufficient weight loading desirably is used in order to provide a detectable spectral signal using the contemplated detection method. For example, if spectral data is to be detected using a hyperspectral imaging device positioned at a particular distance from the substrates, a sufficient weight loading of taggants is used to allow the imaging device to detect image pixels including the taggants from such distance. If a spectrometer or other detection device is to read the signal in close proximity to the substrate, much lower weight loadings are needed to read the signal. If the weight loading is too low, the signal from the taggants may be weaker than desired. On the other hand, at some threshold, using greater amounts of taggants may not provide sufficient additional spectral benefit to justify the extra taggant cost and even may render the corresponding signature output unreadable if so much is used that too much incident light is absorbed to cause the output to look black or otherwise darkened to the camera. Also, mechanical or optical properties of the spectral taggant layer may be adversely impacted if the weight loading is too high. For example, the layer may become too brittle if the loading is too high. Also, the spectral taggant layer could end up with too many voids if the weight loading of taggant is too high. This could reduce the optical clarity of the layer, making the spectral signal more difficult to read.

Balancing such concerns, illustrative embodiments of spectral taggant layers may include from 0.01 weight percent to 70 weight percent, preferably 1 weight percent to 55 weight percent, more preferably 10 weight percent to 55 weight percent of one or more taggants based on the total weight of the spectral taggant layer not including any solvent. When more than one taggant is used in one or more spectral taggant layers of a taggant particle, the weight ratio of the taggants can vary over a wide range. Indeed, because a spectral output may depend on the particular weight ratio(s) used, the weight ratio may contribute to characteristics of the spectral signature encoded in the spectral output of the taggant system being used. In many illustrative embodiments, the weight ratio between any two taggants of a multi-taggant system may be in a range from 1:500 to 500:1, even 1:100 to 100:1, even 1:20 to 20:1, or even 1:5 to 5:1. As used in this specification, all weight loadings, concentrations, percent and other weight-based formulations are expressed on a solids basis not including solvent unless otherwise expressly noted.

Any opaque base layer or spectral taggant layer may include one or more optional, additional ingredients, as desired. Examples of such additional ingredients include antioxidants, ultraviolet (UV) stabilizers, antistatic agents, dispersing aids, viscosity modifying agents, foam control agents, crosslinking agents, catalysts, dyes, pigments, fungicides, bactericides, moisture scavengers, or the like.

In many embodiments, it is desirable that the taggant particles 10 are platelet shaped. For an individual platelet shaped taggant particle 10, the ratio of the width to the height is at least 1:1, preferably at least 2:1. Desirably, such ratio for an individual particle 10 is 20:1 or less, or even 10:1 or less, or even 5:1 or less. For a population of platelet shaped taggant particles 10, this means that the ratio of the lower end of the width range to the height is at least 1:1, preferably at least 2:1. Desirably, such ratio for a population of particles 10 is 20:1 or less, or even 10:1 or less, or even 5:1 or less.

Platelet shaped particles offer a deployment advantage that makes such particles particularly well suited for remote reading of spectral signatures. When reading a spectral signature of the particles 10 remotely from a distance, it is helpful to be able to view the particles 10 face-on with a major face 12 viewable by the device that is reading the signature. Due to the way in which the taggant particles 10 are structured (described further below), face-on viewing provides the strongest, most consistent reading with minimal background noise that could impact the character of the signature being read. Advantageously, platelet-shaped particles tend to be deployed in a flat manner on marked substrates so that a major face 12 tends to face outward for easier viewing by the remote reading device.

One or more individual opaque base layers or spectral taggant layers independently may have individual thicknesses selected from a wide range. As general guidelines, an opaque base layer or a spectral taggant layer as cured desirably has a thickness around 10 microns. When formed in sheet form prior to being comminuted (i.e., broken up) into smaller particles (see below), the thickness of a cured opaque base layer can be measured by using an inexpensive digital caliper such as a micrometer. If the layer is added to an existing stack forming a sheet, the increased thickness attributed to the added opaque base color layer also can be determined using caliper measurements.

In the practice of the present invention, the overall height of a taggant particle 10 is determined by measuring the height dimension of the side at three locations generally equidistant around the perimeter of the particle. If the perimeter 20 has a rounded profile, the height is measured inboard from the rounded profile. The height is taken to be the average of the three measurements. Taggant particles of the present invention such as those described in FIGS. 1 to 6 may have an overall height selected from a wide range of sizes. In many embodiments, suitable taggant particles have a height dimension, or thickness, in the range from 10 microns to 500 microns, more preferably 10 microns to 200 microns, even more preferably 10 microns to 150 microns.

The manufacturing method described below allows the height dimension or thickness to be easily controlled during manufacture. The reason is that the particles are made from a larger, multi-layer sheet whose individual layers and the resultant layer stack are formed with uniform thicknesses. That larger sheet is broken up into smaller pieces in a manner so that the multilayer structure, and therefore the original multilayer thickness, is preserved in the resultant particles. Because the height of a population of taggant particles 10 is so uniform when the particles 10 are manufactured using the illustrative manufacturing method described below, the average height of a population of taggant particles 10 can be taken as the average heights of five (5) taggant particles 10 in the population if the population includes five or more taggant particles 10, or the average height of all the taggant particles 10 if the population includes four or less taggant particles 10.

Taggant particles of the present invention such as those described in FIGS. 1 to 6 may have a width selected from a wide range of sizes. As described below, the present invention provides a technique to measure the width of an individual taggant particle 10 as well as the average width expressed as a range for a population of taggant particles 10. In many suitable embodiments, individual taggant particles have a width in the range from 10 microns to 2000 microns, preferably 20 microns to 1500 microns, more preferably 30 to 300 microns. In many suitable embodiments, populations of taggant particles may have an average width expressed as a size range in which the lower end of the range is from 10 microns to 180 microns and the higher end of the range is in the range from 10 microns to 200 microns with the proviso that the higher end of the range is equal to or greater than the lower end of the range.

In the practice of the present invention, the width dimension of a major face 12 of an individual taggant particle 10 is derived from the area of the larger of the two major faces 12. Area is used to determine the width dimension of an individual taggant particle 10 due to the irregular perimeter 20. Although actual width dimensions across an irregular shaped perimeter 20 can differ depending on where a width measurement is taken, the area can be determined accurately and consistently using optical microscopy. After the area of a major face 12 is determined using optical microscopy, the width dimension of the major face is taken to be the diameter of a circle having that area using the relationship that the area, A, of a circle in terms of diameter, D, is given by Equation (1):

$$A = \left(\frac{\pi}{4}\right) \times D^2 \quad (1)$$

Therefore, the diameter, D, in terms of the area, A, is given by Equation (2)

$$D = \sqrt{\frac{4A}{\pi}} \quad (2)$$

In contrast to determining the width dimension of an individual taggant particle 10 according to Equation (2), the average width associated with a population of classified taggant particles can be expressed as a size range in terms of the fine and coarse screens used to obtain the classified taggant particles using the screen classification technique discussed further below in the context of an illustrative method of making the taggant particles 10. As described below, a batch of taggant particles 10 can be classified into a particular size range using a relatively finer mesh screen and a relatively coarser mesh screen. Each such screen generally will have a specification that defines the mesh opening size of the screen. Exemplary mesh specifications often express the mesh opening size in terms of gauge size, area, or a linear length dimension. Any of these kinds of specifications can be converted into units of another specification. For example, a gauge size can be expressed in terms of micrometers (microns) and vice versa. In the practice of the present invention, the average particle width of a population of classified taggant particles 10 is taken as the range extending from the mesh size of the finer screen, expressed in microns, to the size of the coarser screen, expressed in microns.

If the screen sizes used to obtain a population of taggant particles 10 is not known, then the average particle width of such a population can be determined using a screening evaluation technique. A library of screens whose mesh sizes are spaced at regular 25-mesh intervals (e.g., a set of screens characterized as 25 mesh, 50 mesh, 75 mesh, 100 mesh, 125 mesh, etc.) is provided. The finest screen is identified that captures 90 weight percent or more of the population. The coarsest screen is identified that allows 90 weight percent or more of the population to pass. The average width of that population is then given as the range from the mesh size of the finer screen expressed in microns to the mesh size of the coarser screen expressed in microns.

A wide variety of one or more different taggants can be used in the spectral taggant layers of FIGS. 1 to 6 as well as other embodiments of spectral taggant. Illustrative taggants include luminescent compounds, IR absorbing compounds, infrared reflecting compounds, ultraviolet absorbing compounds, ultraviolet reflecting compounds, combinations of these, and the like. Suitable luminescent taggants generally absorb incident light of suitable wavelength characteristics, experience photoexcitation, and then re-emit light as they relax to a stable ground state. Hence, luminescent light emission is different from incident light that is merely reflected or transmitted. Often, a luminescent compound absorbs light of certain wavelength(s) and re-emits light of a longer wavelength (down conversion). Some luminescent compounds may absorb light of certain wavelength(s) and re-emit light of a shorter wavelength (up conversion), however.

Luminescent compounds include phosphors (up and/or down converting), fluorescent compounds (sometimes referred to as fluorophores or fluorochromes) and/or phosphorescent compounds. Fluorescent compounds are preferred. Without wishing to be bound, it is believed that fluorescence results from an allowed radiative transition from a first excited singlet state to a relaxed singlet state. Without wishing to be bound, it is believed that phosphorescence results from an intersystem crossing from an excited singlet state to an excited, spin-forbidden transition state (typically a triplet state) followed by an allowed radiative transition into a relaxed singlet state. Luminescent compounds useful in the practice of the present invention may be inorganic or organic. Fluorescent compounds in the form of organic dyes are particularly preferred.

When more than one taggant is used, taggants may be selected that interact according to fluorescence resonance energy transfer (FRET). FRET refers to a mechanism involving energy transfer between luminescent molecules.

In practical effect, FRET occurs in a sequence where an illumination initially triggers a promotion to an excited state by a first, or donor molecule. The energy absorbed by the donor molecule may be transferred through non-radiative processes and trigger a further fluorescent emission by a second, or acceptor fluorescent compound.

An optical brightener is one kind of luminescent compound that has been incorporated into label ink(s) to help make label features look visibly whiter and brighter to a user. One or more optical brightener compounds also are useful as taggant compounds in the practice of the present invention. An optical brightener typically absorbs ultraviolet or violet tight and then re-emits light including emissions in the blue region of the electromagnetic spectrum (e.g., about 450 nm to about 500 nm). The practice of the present invention appreciates that the optical properties (e.g., fluorescent properties) of one or more optical brightener compounds can be used to encode all or a portion of a spectral code. In some modes of practice, suitable optical brightener compounds are luminescent compounds emit a luminescent response including blue light having at least one emission peak in the range from 450 nm to 500 nm in response to ultraviolet or violet illumination. A preferred illumination to trigger such a response is ultraviolet or violet light emitting diode (LED) illumination having an emission peak in the wavelength range from 200 mu to 420 nm.

In the practice of the present invention, ultraviolet light is light that has one or more wavelength peaks in the range from 100 nm to 400 nm. Violet light is light having one or more wavelength peaks in the range from greater than 400 mu to 420 nm. Blue light refers to light having one or more wavelength peaks in the range from 420 nm to 500 nm. Infrared light is light having one or more wavelength peaks in the range from 700 nm to greater than 1200 nm.

As between using illumination in the ultraviolet range or the violet range to trigger a fluorescent response in an optical brightener compound, ultraviolet light is preferred. The reason is that ultraviolet light has less potential to overlap and wash out the blue light fluorescently emitted by an optical brightener compound as compared to using violet illumination. As a practical matter, this means that using ultraviolet illumination to trigger the luminescent signature response of an optical brightener compound makes the emitted signature easier to detect and resolve without interference from the illuminating light.

In particular, the spectrum of ultraviolet or violet LED illumination, for example, may be used to illuminate an optical brightener in spectral code strategies, because such illumination is shifted away from the blue light and higher (if any) wavelength emissions, of the optical brightener. Consequently, the spectral code features of the optical brightener in the blue light and longer wavelength regimes can easily be detected while those of the LED illumination can be blocked from reaching the detector by an appropriate optical filter. In the cause of using ultraviolet LED illumination with a peak intensity at 385 nm, for example, the corresponding detector may be fitted with an optical filter over the detector(s) to block out at least a portion of the illumination wavelengths, e.g., wavelengths below about 400 nm, or even below about 430 nm, from reaching the detector(s). In one aspect, therefore, the present invention appreciates that the luminescent emissions of optical brightener compounds in the blue light regime from about 420 nm to about 500 nm incorporate useful spectral code features.

Examples of fluorescent compounds suitable for use as compounds 24 and/or 26 are described in U.S. Pat. Nos. 8,034,436; 5,710,197; 4,005,111; 7,497,972; 5,674,622; and 3,904,642.

Examples of phosphorescent compounds for use as compounds 24 and/or 26 are described in U.S. Pat. Nos. 7,547,894; 6,375,864; 6,676,852; 4,089,995; and U.S. Pat. Pub. No. 2013/0153118.

Examples of optical brightener compounds are described in U.S. Pat. Nos. 6,165,384; 8,828,271; 5,135,569; 9,162,513; and 6,632,783.

Examples of infrared absorbing compounds are described in U.S. Pat. Nos. 6,492,093; 7,122,076; 5,380,695; and Korea patent documents KR101411063; and KR101038035.

Examples of up and down converting phosphors are described in U.S. Pat. Nos. 8,822,954; 6,861,012; 6,483,576; 6,813,011; 7,531,108; and 6,153,123. Phosphors often provide a spectral response to illumination that is time dependent. That is, S=I(t), where S is the spectral response and I(t) is an intensity function that varies with time. Typically, the response starts out at an initial intensity and then decays over a characteristic time period associated with a particular phosphor compound. The decay often is non-linear.

The taggant particles of the present invention such as those illustrated in FIGS. 1 to 6 may be manufactured using a variety of different methods. According to a preferred approach, the taggant particles of the present invention such as those described in FIGS. 1-6 may be manufactured using a three-stage process. In a first stage, a multilayer sheet of substantially uniform thickness is prepared. The layer stack in the sheet corresponds to the sequence of layers in the desired taggant particles. For example, to prepare a sheet corresponding to the taggant particles 10 of FIGS. 1 and 2, a layer stack would include a layer corresponding to opaque base layer 22 and spectral taggant layer 24. The sheet may be formed with either layer 22 supporting layer 24 or vice versa. As another example, to prepare a sheet corresponding to taggant particle 90 of FIG. 6, a multilayer sheet would be prepared that has a sequence of layers stacked in a manner corresponding to the layer stack of spectral taggant layers 92, 98, 104, 112, and 118 and opaque base layers 124 in taggant particles 90.

Each layer of the sheet will have a thickness that matches the desired, corresponding layer thickness. The length and width of the sheet are less critical, as the sheet will be broken up into taggant particles in a subsequent step. Smaller sized sheets produce fewer particles (and less overall particle volume) per batch, which reduces the economy of scale. Larger sheets, though, can become more difficult to handle. Balancing such concerns, in some modes of practice, a resultant sheet may have a width from 6 cm to 2 m and a length from 6 cm to 4 m. The layers desirably are deposited and at least partially cured prior to depositing subsequent layers so that the various layers resist delamination and are distinctly formed on each other. Layers may be partially cured to preserve layer identity initially, and then the final sheet can be fully cured after all or one or more additional layers are formed. Alternatively, if the polymer matrix materials being used adhere strongly to each other, layers may be substantially fully cured prior to forming further layers.

Desirably, the multilayer sheet is formed on a suitable carrier having a low adhesion surface to allow the resultant sheet to be releasably formed on the carrier. The carrier desirably is sufficiently flexible and is strong enough to be peeled away from the resultant sheet. Carriers may be selected for one-time use or may be re-usable.

Desirably, the one or more polymer matrices formed among the various layers are derived from one or more crosslinkable monomers, oligomers, and/or polymer that provide a resultant sheet that has a good balance of flexibility and resilience to form a sheet of good integrity, and yet still is sufficiently brittle to allow the sheet to be broken up, or comminuted, into taggant particles, without being too brittle such that layers of the resultant particles are unduly prone to separation from each other. In some instances, a sheet that is not sufficiently brittle enough to be comminuted in this manner can be chilled until suitably brittle. When a sheet might be too brittle for comminution and yet is strong enough in particle form, the sheet might be heated until it becomes less brittle in a manner effective to allow comminution. Optionally, surface indicia may be formed on the sheet at this first stage using techniques such as those described in U.S. Pat. No. 4,390,452.

In a second stage, the sheet is broken up, or comminuted, into a batch of taggant particles. Desirably, comminution occurs in a manner such that the largest width of the resultant particles is no smaller than about 10 microns and no larger than about 3000 microns. Illustrative comminution strategies may use one or more milling techniques such hammer milling, jet milling, rod milling, roller milling, blade milling, SAG milling, vertical shaft impact milling, tower milling, impact milling, combinations of these, and the like.

The particles resulting from the second stage of manufacture may be used without further processing. However, the second stage of manufacture often produces a batch of taggant particles with a large particle size distribution. It often may be desirable to classify the particles into smaller groups with tighter size distributions. Accordingly, a third optional stage of manufacture classifies the particles into such smaller groups. This is quickly and economically accomplished using screen classification techniques using a relatively coarse screen and a relatively finer screen.

For example, in one illustrative mode of practice, initially a relatively coarse, 200 mesh screen (mesh openings of 75 microns) is initially used to separate particles under 75 microns in size from larger particles. Because milling media tend to be much larger than this, this step screens out milling media as well. The smaller particles that pass through the screen can then be passed through a 400 mesh screen (mesh openings of 37 microns). This captures particles that are larger than 37 microns. Because the captured particles passed through the 200 mesh screen initially and subsequently were captured by the 400 mesh screen, the captured particles now provide a taggant particle group with a narrow width distribution in the range from 37 microns to 75 microns.

The larger, coarser particles captured by the 200 mesh screen can be recycled to the comminution stage if desired in order to grind those into smaller particles that would then be returned to the third, screening stage. The smaller, finer particles that passed through the 400 mesh screen can be further separated into other particle groups, such as further screening with a 500 mesh screen. This can be repeated to prepare even finer sized groups until screening is no longer practical.

As another option, and initial screening can start with a coarser screen than 200 mesh, e.g., 16 mesh or 50 mesh or the like, and then one or more finer mesh screens can be presented in order to capture various size groupings of particles. As another option, the example uses a 200 mesh screen and then a 400 mesh screen. The size gap between these two screens is 200 mesh. Smaller or larger size gaps could be used. A larger size gap would provide a group with a larger size distribution. A smaller size gap would provide a group with a tighter distribution. As another option, the finer mesh screen can be used initially to capture particles larger than that fine mesh size. After this, a larger mesh screen may be used to limit the upper size range of the group.

The resultant particles can be deployed to mark a wide range of substrates. Examples of substrates include identification cards, apparel (clothes, shoes, headgear, and the like), packaging, motor vehicles, aircraft, marine craft, cargo, gemstones and other minerals, chemicals, construction and building materials, equipment, tools, electronics, appliances, food or beverage products, casino chips and the like. Specific examples of these products and product combinations such as liquor bottle labels and caps; safety seals for food, electronic equipment, and the like. Moisture mitigation systems such as silica packets, moisture absorbing labels, and the like. Other examples include printers and ink cartridges; capital equipment and corresponding consumables such as belts, adhesive pads, and fasteners; lab analysis equipment and corresponding consumables such as lab testing units, pipettes, vials; check scanners in the banking industry and corresponding consumables such as ink jet cartridges; product and packaging labels, etc. The substrates can be marked to accomplish a wide range of objectives such as to automatically identify and/or authenticate the items or workpieces so that appropriate automated processes, identification, authentication, quality control, tracking, tamper detection, inventory practice, pricing, remote data harvesting, or the like can be carried out. Particles can also be mixed into bulk materials such as iron ores, copper ore, plastic masterbatch, rubbers, silicons, etc. for authentication and dilution detection.

The resultant particles can be deployed on substrates in a variety of ways. According to one strategy, the particles are used in particle form and then compounded into or otherwise incorporated into or onto a substrate to be marked. As another example, taggant particles of a suitable size may be incorporated into printable inks. These inks are then printed onto the desired substrate in one or more layers optionally in combination with one or more other printed features or structures. Further details of how such printed inks may be used are described in Assignee's U.S. Provisional Applications Ser. No. 62/866,722, filed Jun. 26, 2019, for Standardization of Taggant Signatures Using Transfer Images in the names of Brogger et al.; and 62/893,505, filed Aug. 29, 2019, for Standardization of Taggant Signatures Using Transfer Image, in the names of Brogger et al., wherein the entireties of each of these patent application is incorporated herein by reference in its respective entirety for all purposes. As another example, taggant particles may be incorporated into coating compositions that are applied onto substrates using non-printing techniques such as rolling, brushing, spraying, curtain coating, spin coating, pouring, or the like. As another example, taggant particles may be fluidized in a gas carrier and sprayed, caused to contact, or otherwise coated onto or into a desired substrate.

Coating compositions comprising one or more taggant particle embodiments of the present invention are particularly preferred. In general, such compositions include one or more embodiments of taggant particles of the present invention dispersed in a liquid carrier. Liquid carriers may be aqueous, solvent-based, and/or fluid precursors of a polymer matrix (e.g., monomers, oligomers, or sufficiently fluid polymers that physically dry and/or chemically cure to form a solid matrix containing the taggant particles). Aqueous liquid carriers include water and optionally a co-solvent such as methanol, ethanol, isopropyl alcohol, ethylene glycol, propylene glycol, glycerin, glycofural, polyethylene glycols, acetic acid, citric acid, acetone, acetonitrile, 1.2-dimethoxy-ethane, dimethyl formamide, hexamethylphosphoramide, hexamethylphosphoroustriamde, pyridine, or combinations of these. In addition to these, other suitable co-solvents in aqueous media may include one or more other polar solvents that are fully or partially miscible with water (determined at 25 C and 1 atm of pressure) such as dimethyl sulfoxide, methyl ethyl ketone, or chloroform, or a combination of these. When a co-solvent is used in an aqueous liquid carrier, the weight ratio of water to the one or more co-solvents may vary over a wide range. In some embodiments, this ratio is greater than 1:10, preferably from greater than 1:10 to 500:1, or even from greater than 1:1 to 100:1, or even from greater than 1:1 to 20:1.

Solvent-based liquid carriers may include a wide range of one or more organic solvents. Examples include any of the co-solvents listed above, 1-butanol, 2-butanol, 2-butanone, carbon tetrachloride, chlorobenzene, 1,2-dichloroethane, diethylene glycol, diethyl ether, ethyl acetate, heptane or other larger hydrocarbon, methyl-t-butyl ether, methylene chloride, nitromethane, pentane, petroleum ether, toluene, xylene, a fatty acid, a fatty acid ester, combinations of these, and the like.

The weight loading of the one or more taggant particle embodiments in the liquid carrier may vary over a wide range. Generally, a weight loading is selected while making sure that the resultant viscosity of the coating composition is compatible with the intended application technique. For example, coating compositions applied by trowel can be relatively thicker than coating compositions to be sprayed. In some embodiments, a coating composition includes from 0.1 weight percent to 50 weight percent, preferably 0.25 weight percent to 20 weight percent, or even 0.5 weight percent to 5 weight percent of one or more taggant particles based on the total weight of the coating composition including any solvent.

In addition to the liquid carrier and one or more taggant particle embodiments, a coating composition may include one or more additional, optional ingredients. Examples including foam control agents, viscosity modifying agents, antioxidants, ultraviolet (UV) stabilizers, antistatic agents, dispersing aids, crosslinking agents, catalysts, dyes, pigments, fungicides, bactericides, moisture scavengers, or the like.

A significant advantage of the taggant particles of the present invention is that they provide a strong spectral signal in a wide variety of illumination conditions. This allows the spectral signal to be read remotely from a distance, such as by using imaging techniques, particularly multispectral imaging techniques, and more particularly hyperspectral imaging techniques. These strategies not only allow systems of the present invention to detect whether taggant particles with the proper spectral signature are present in the field of view of an imaging capture device, but also to pinpoint where in the image the spectral signature (if present) is detected.

An imaging device often may capture image information for a field of view in which the image information includes millions of image pixels. Multispectral imaging refers to an imaging technique in which an imaging device captures a spectrum for each pixel, or for pixel groups, within the field of view of the imaging device. Pixel groups may be any subset of the full set of pixels that make up the image information. In many instances, if spectrum information is generated for pixel groups rather than individual pixels, such pixel groups may include from 2 to 1000, even 2 to 100, or even 2 to 10 pixels. Image information may be subdivided into an array of pixel groups based upon physical location of where those pixels are located in the image. Such pixel groups include pixels that are adjacent in the image. Alternatively, pixel groups may be subdivided based on one or more optical or other characteristics of the pixels other than location. Such grouped pixels may not be adjacent in the image.

Multispectral imaging techniques capture spectra for each pixel or pixel group at one or more contiguous or spaced apart wavelength bands of the electromagnetic spectrum. Often, spectra are obtained from one or more portions of the electromagnetic spectrum from wavelengths as low as about 200 nm (a lower range of UV light) to wavelengths up to about 13,000 nm or portions thereof. In lower ranges, wavelengths of 200 nm to about 1500 nm or one or more portions thereof would be suitable. Examples of higher wavelength ranges used for imaging may include one or more of NIR 900 nm to 1700 nm; SWIR 1000 nm to 2500 nm; MWIR 2700 nm to 5300 nm, or LWIR 8000 nm to 12,400 nm, or one or more portions of these.

Some embodiments of multispectral imaging techniques capture spectra for a relatively small number of wavelength bands, such as 3 to 15 wavelength bands. Hyperspectral imaging is a type of multispectral imaging for which spectra for more than 15, even 20 to 2000, even 50 to 500 wavelength bands are captured. A significant aspect of the present invention is the discovery that taggant particles according to the present invention are compatible with multispectral/hyperspectral techniques to allow spectral signatures to be remotely read from a distance.

Figure 7A:
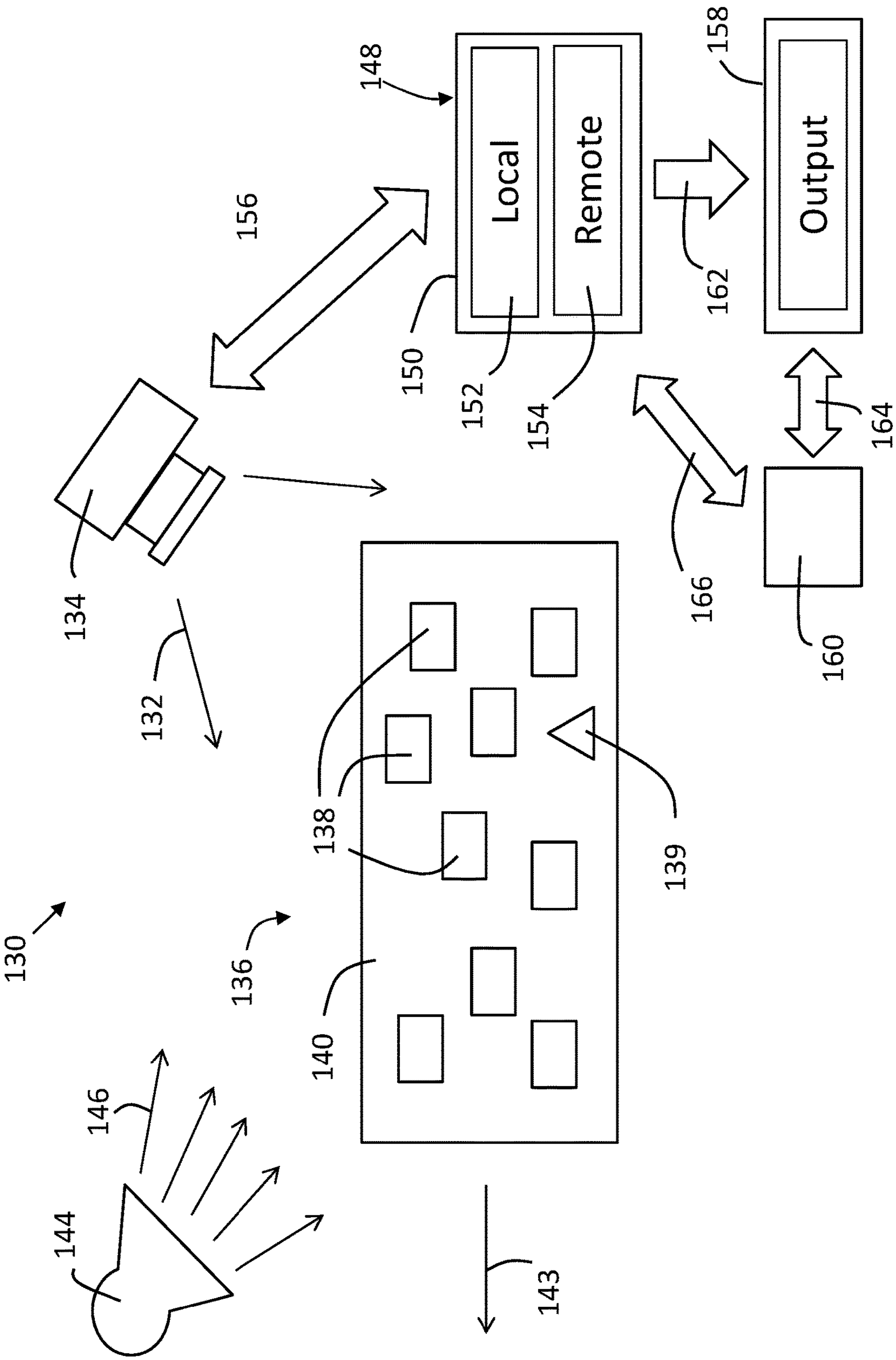
FIG. 7*a* schematically illustrates a system of the present invention in which multilayer taggant particles and multispectral (e.g., hyperspectral) imaging techniques are combined to allow spectral signatures of the taggant particles to be remotely detected and located from a distance.

FIG. 7*a* schematically shows an illustrative system 130 of the present invention that uses a combination of visual imaging (e.g., image capture that encodes the visual characteristics of a field of view) and multispectral/hyperspectral imaging techniques to remotely detect if taggant particles of the present invention are present in the field of view 132 of a multispectral/hyperspectral image capturing device 134. The system 130 then produces an output 158 that may indicate if the signature is detected and may produce an output image 170 (see FIG. 7*b*) that highlights objects in the scene whose pixel(s) produced spectral signature(s) of interest. A variety of different imaging devices with multispectral/hyperspectral imaging capabilities are commercially available. Examples of commercially available imaging devices with these capabilities are the hyperspectral cameras commercially available under the SPECIM FX SERIES trade designation from Specim Spectral Imaging Oy Lt., Finland.

For purposes of illustration, system 130 is being used to analyze a scene 136. The scene 136 includes a plurality of rough, mined diamond stones 138 being transported on conveyor 140 in the direction of arrow 143 for further handling. Diamond stones 138 have been marked with taggant particles of the present invention according to the authorized mine from which the diamond stones 138 were uncovered. Each mine in this illustration is associated with its own, unique spectral signature(s), and diamond stones 138 from that mine have been marked with corresponding taggant particles that encode the proper, unique spectral signature(s). An exemplary objective of system 130 in this illustration is to remotely scan the stones 138 in order to confirm that the diamond stones 138 are sourced from authorized mines rather than being injected into the process from an unauthorized mine. One reason to track diamond stones 138 in this manner is to be able confirm to a downstream buyer or other entity that a particular stone is sourced from a particular authorized mine. This may be commercially important, because the mine source from which a diamond stone is mined can impact the value or other favor accorded to a stone.

Field of view 132 of imaging device 134 encompasses scene 136. Imaging device 134 is used to capture both visual and multispectral image information of scene 136. Images may be captured in a variety of forms including in the form of still images, push-broom images, and/or video images either continuously or at desired intervals. This can occur manually, or the image capture can be automated. An optional illumination source 144 illuminates the scene 136 with illumination 146. Generally, optional illumination source 144 is used to help maintain similar illumination in a variety of reading conditions, as this helps to allow signatures to be defined with tighter tolerances for higher security. In some instances, illumination source 144 may not be needed such as when image capturing device 134 captures image information outdoors in the daytime when there is adequate sunlight. At night time, if it is too cloudy, indoors, or in other low light conditions, or in applications in which ambient illumination could vary unduly, using a broadband white light illumination can be useful to help allow detection of a consistent stronger spectral signature from taggant particles, if present. Further, if any the taggant materials luminesce or otherwise need a particular type of illumination in order to generate a desired spectral output, illumination source 144 may be selected to provide the appropriate illumination. The scene 136 optionally may include a reference plaque 139, such as a white, black, or grey reference surface that serves as an in-frame reference to help calibrate the visual and/or multispectral image information.

Illumination source 144 can illuminate scene 136 with more than one type of illumination 146, often occurring in sequence. Image capturing device 134 may then read the spectral output of scene 134 associated with each type of illumination. In some embodiments, illumination system 144 may provide illumination 146 that includes two or more, preferably 2 to 10 wavelength bands of illumination in sequence. These wavelength bands may be discrete so that the illuminations do not have overlapping wavelengths. In other instances, the wavelength bands may partially overlap. For example, an illumination providing predominantly illumination in the range from 370 nm to 405 nm would be distinct from an illumination providing predominantly illumination in a range from 550 nm to 590 nm. As another example, three illuminations in the wavelength ranges 380 nm to 430 nm, 410 nm to 460 nm, and 440 nm to 480 nm, respectively are different types of illumination even though each partially overlaps with at least one other wavelength band.

Generally, illumination source 144 uses one or more types of illumination 146 that are used that are able to help produce appropriate spectral output from the taggant particles that provide the proper spectral signature(s). For example, illumination 146 can include selected bands of the electromagnetic spectrum such as one or more of ultraviolet light, violet light, blue light, green light, indigo light, yellow light, orange light, red light, broad band light, infrared light, combinations of these, and the like. Ultraviolet (UV) light includes UV-C light having a wavelength in the range from 100 nm to 280 nm, UV-B light having a wavelength in the range from 280 nm to 315 nm, and UV-A light having a wavelength in the range from 315 nm to 400 nm.

Many kinds of different illumination sources 144 can be used. Light emitting diodes (LEDs) are convenient illumination sources. LEDs are reliable, inexpensive, uniform and consistent with respect to illumination wavelengths and intensity, energy efficient without undue heating, compact, durable, and reliable. Lasers, such as laser diodes, can be used for illumination as well. As one advantage, laser illumination would offer a benefit of increasing the taggant signal. Broadband white light is suitable in some embodiments.

Image capture device 134 provides captured image information to control system 148. Control system 148 generally includes controller 150, output 158, interface 160, and communication pathways 156, 162, 164, and 166. Communication pathway 156 allows communication between image capture device 134 and controller 150. Some or even all aspects of controller 150 may be local components 152 that are incorporated into image capture device 134 itself. Other aspects of controller 150 optionally may be incorporated into one or more remote server or other remote control components 154. Communication pathway 162 allows controller 150 to communicate with output 158. Communication pathway 164 allows the output 158 and interface 160 to communicate. Communication pathway 166 allows the interface 160 and the controller 150 to communicate.

Control system 148 desirably includes program instructions that evaluate the captured information in order to determine if and where the proper spectral signature(s) are present in the scene 136. The signatures, for example, may involve zones associated with a plurality of detected wavelength bands for a plurality of different color channels for the different illumination wavelengths (e.g., different illumination colors). If the proper taggant particles are present, the proper signature is detected from corresponding image pixels. In contrast, a target without the proper taggant particles would not produce the proper spectral signature if at all. Control system 148 provides an output 158 in order to communicate the results of the evaluation. The output 158 can indicate information indicative that the proper spectral signature is present or is not detected. If it is detected, the output 158 can show the location of the pixels including the signature.

The output 158 may be provided to other control system components or to a different system in order to take automated follow up action based on the results of the evaluation. The output 158 also may be provided to a user (not shown) through interface 160. Interface 160 may incorporate a touch pad interface and/or lights whose color or pattern indicates settings, inputs, results, or the like. Interface 160 may as an option may include a voice chip or audio output to give audible feedback of pass/fail or the like. Additionally, controls (not shown) may be included to allow the user to interact with the control system 148.

Figure 7B:
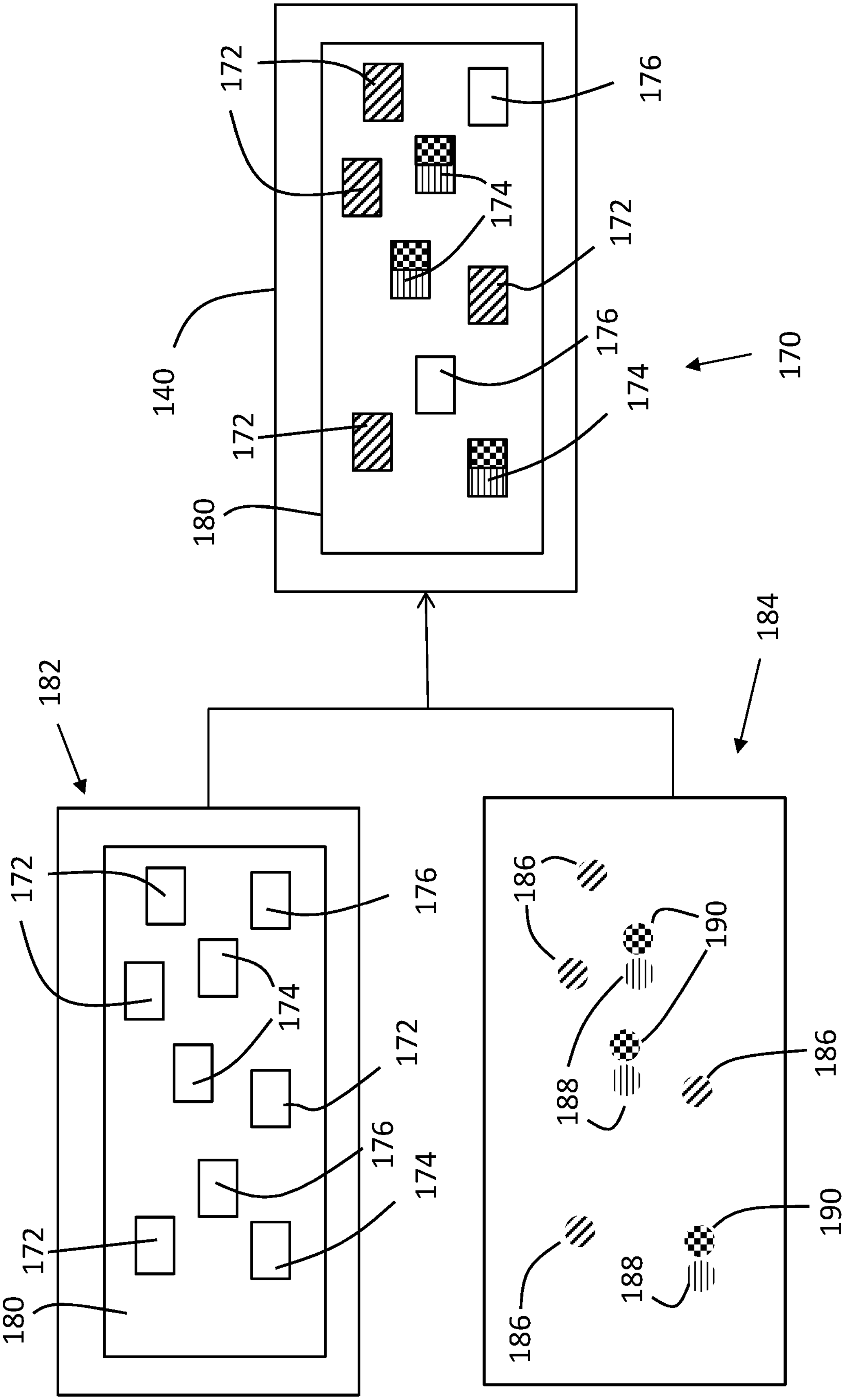
FIG. 7*b* schematically shows an output of the system of FIG. 7*a* in which pixels of the image that produce proper spectral signatures are detected and located in an output image.

FIG. 7*b* schematically shows how an illustrative output image 170 is generated by system 130 of FIG. 7*a*. Output image 170 is in the form of a still image of scene 136 showing diamond stone images 172, 174, and 176 on the conveyor image 170.

Diamond stone images 172 are shaded in a manner to show that the actual stones corresponding to images 172 have a particular, authorized spectral signature associated with a particular mine.

Diamond stone images 174 are shaded in a manner to show that the actual stones corresponding to images 174 have a combination of two different, authorized spectral signature associated with a second mine. One way to provide two different spectral signatures in images 174 is to incorporate two different taggant particles onto the corresponding stones. Another approach is to use a two-sided taggant particle embodiment with different taggant layers on each side such as that shown in FIG. 6.

Diamond stone images 176 are presented in a manner to indicate the corresponding stones are not marked with any spectral signature. Therefore, the stones associated with images 176 did not come from an authorized mine source in the context of the present illustration.

Note how output image 170 shows the location of the corresponding stones in the stone images 172, 174, and 176. In addition to such image information, control system 148 also can capture other information associated with the image 170 such as the time and date of the image 170, the location at which the image 170 was captured, personnel on duty at the time, an identification of the authorized mines, and the like.

FIG. 7*b* schematically shows how output image 170 is derived from both visual image information and multispectral image information captured by system 130 of FIG. 7*a*. Visual image 182 encodes a visual image of scene 136. Machine vision analysis techniques are used to identify objects in the scene 136 such as the conveyor image 180 and the stone images 172, 174, and 176. Machine vision techniques allows these objects to be identified within image 182, but does not include information that allows each object to be associated with one or more corresponding spectral signatures (if any).

Multispectral image 184 encodes multispectral image information that allows each pixel or a group of pixels to be evaluated for spectral signature information. If a particular spectral signature is detected, the particular pixel or pixel group that produced the detected signature is identified. Image 184 shows how pixels 186 produced a first signature, pixels 188 produced a second signature, and pixels 190 produced a third signature.

Control system 148 (FIG. 7*a*) uses image 182 and image 184 in order to derive image 170. In practical effect, control system 148 uses the pixel information in image 184 in order to determine which objects in image 182 produced one or more spectral signatures. Control system 148 uses this evaluation in order to match each object with corresponding spectral signature(s) if applicable. The result is that image information 170 highlights an object depending on whether any pixels associated with the object produced signature(s) of interest.

Figure 8A:
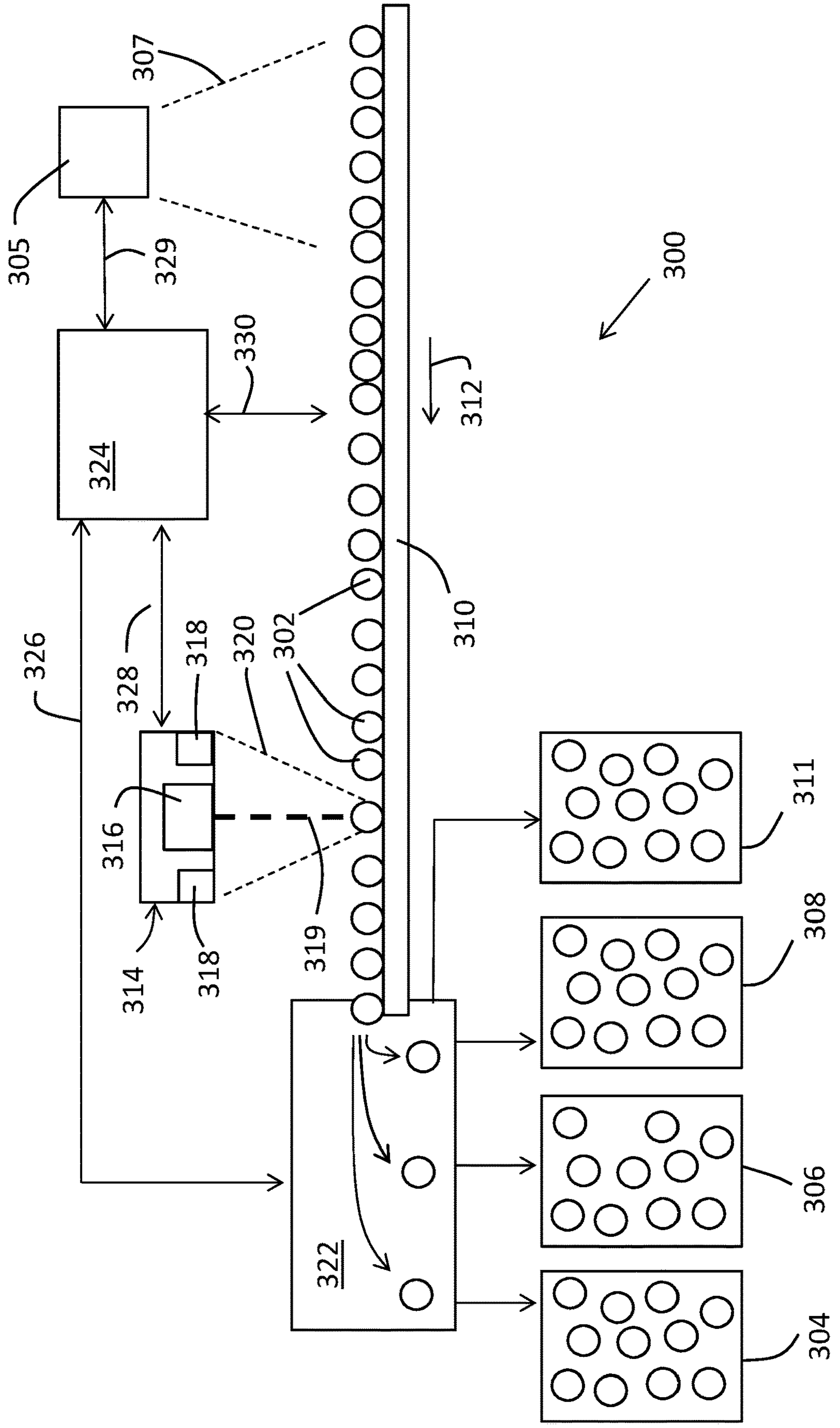
FIG. 8*a* schematically illustrates a system of the present invention that is used with machine vision and/or pattern recognition functionalities to accomplish automated, high speed sorting using taggant particles of the present invention on objects that are hard to distinguish using conventional imaging techniques.

FIG. 8*a* schematically illustrates a sorting system 300 that integrates taggant functionality and at least one of machine vision and/or pattern recognition functionalities in order to accomplish high speed, automated sorting of objects 302. Objects 302 are not distinguishable to the unaided human eye. However, objects 302 are marked with taggant particles of the present invention to allow easy identification and sorting. System 300 is useful for sorting a plurality of different objects 302 into sorted fractions 304, 306 and 308, and 311, respectively. For purposes of illustration, system 300 is shown as sorting objects 302 into four different fractions 304, 306 308, and 311. However, system 300 has the capability to automatically sort a plurality of different kinds of workpieces into any number of corresponding fractions or groupings.

In the practice of the present invention, each of objects 302 is respectively marked with different kinds of taggant particles of the present invention. Consequently, objects 302 produce different spectral characteristics. System 300 can use these spectral differences in order to automatically separate the objects 302 into the fractions 304, 306 308, and 311.

Conveyor 310 transports objects 302 in the direction of arrow 312. Visual image capture device 305 captures visual image information of the objects 302 in the field of view 307. One or more optional illumination sources (not shown) may be used to assist with the visual image capture.

Multispectral imaging system 314 is used to capture multispectral image information of the conveyor scene. Multispectral imaging system 314 includes multispectral imaging device 316, preferably with hyperspectral imaging capabilities, and illumination sources 318. Imaging device 316 is used to capture the multispectral image information in a field of view 319. For purposes of illustration, imaging device 316 uses push-broom image capture strategies. Illumination sources 318 illuminate the field of view 319 with illumination beams 320.

The captured image information is conveyed to control system 324 using suitable communication interfaces 328 and 329. Control system 324 uses the captured image information along with machine vision/pattern recognition strategies to detect the different spectral signatures and to thereby distinguish the different kinds of objects 302.

Control system 324 may be used to help control the movement of conveyor 310, and hence transport of objects 302, via a suitable communication interface 330. Control system 324 uses communication interface 326 in order to provide instructions derived from the results of its imaging evaluation to sorting station 322. This causes sorting station 322 to separate objects 302 into the separated fractions 304, 306 308, and 311 to accomplish the desired sorting.

System 300 is very useful in situations in which objects 302 would be difficult to identify based on visual information alone. Examples would include gem stones sorted from different locations; inventory designated for different kinds of further handling, etc. In such examples, the unique spectral signature applied to the different kinds of objects 302 allows them to be easily distinguished and sorted.

Figure 8B:
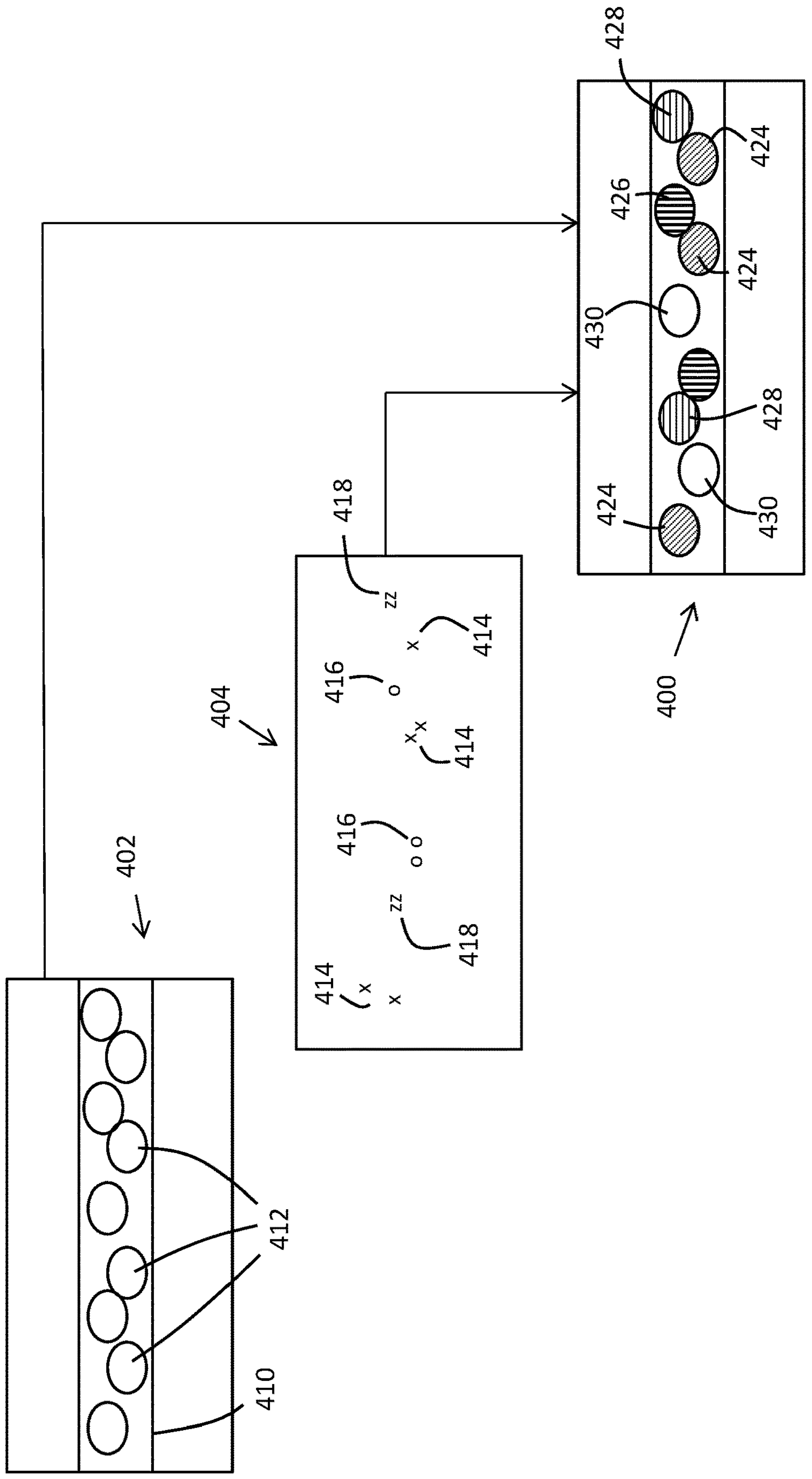
FIG. 8*b* schematically shows an output of the system of FIG. 8*a* that shows how multispectral imaging techniques and machine vision and/or pattern recognition can be used to sort the objects being sorted.

FIG. 8*b* schematically shows how output image information 400 is derived from both visual image information 402 and multispectral image information 404 captured by system 300 of FIG. 8*a*. Visual image information 402 encodes a visual image of the conveyor scene. Machine vision analysis techniques are used to identify objects in the scene such as the conveyor image 410 and the different objects 412 on the conveyor image 410. Machine vision techniques allows these objects 412 to be identified within image 402, but does not include information that allows each object to be associated with one or more corresponding spectral signatures (if any) and thereby distinguished from each other.

Multispectral image information 404 encodes multispectral image information that allows each pixel or a group of pixels to be evaluated for spectral signature information. If a particular spectral signature is detected, the particular pixel or pixel group that produced the detected signature is identified. Image information 404 shows how pixels 414 produced a first signature, pixels 416 produced a second signature, and pixels 418 produced a third signature. Output image information 400 shows how pixels 430 corresponding to two of the objects 412 in the visual image information 402 are identified as not providing a spectral signature.

Control system 324 (FIG. 8*a*) uses image information 402 and image information 404 in order to derive image output 400. In practical effect, control system 324 uses the pixel information in image information 404 in order to determine which objects in image information 402 produced one or more spectral signatures. Control system 324 uses this evaluation in order to match each object with corresponding spectral signature(s) if applicable. The result is that image information 400 highlights an object depending on whether any pixels associated with the object produced signature(s) of interest. Image information 400 shows how objects 424, 426, and 428 corresponding to the pixels 414, 416, and 418, respectively. Objects corresponding to the images 424, 426, and 428 are sorted into the fractions 304, 306, and 308 of FIG. 8*a*, respectively. A further group of objects are not highlighted in image information 400, as no pixels producing signature(s) were detected for these. These objects are sorted into fraction 311 of FIG. 8*a*.

Figure 9:
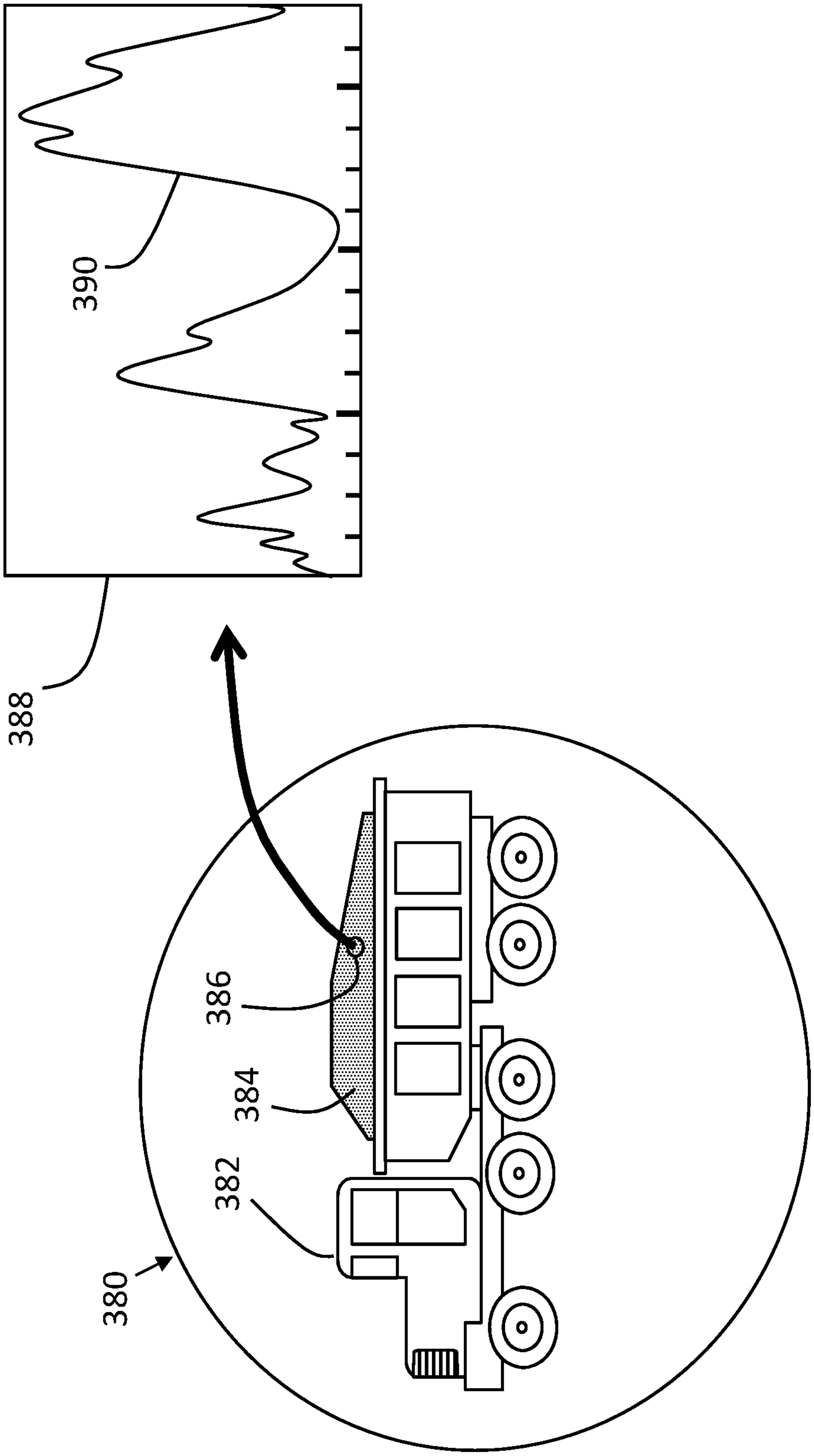
FIG. 9 schematically shows how hyperspectral imaging techniques capture spectral information for individual pixels, or small pixel groups, in an image to allow pixels producing a proper spectral signature to be identified in the image.
Figure 10:
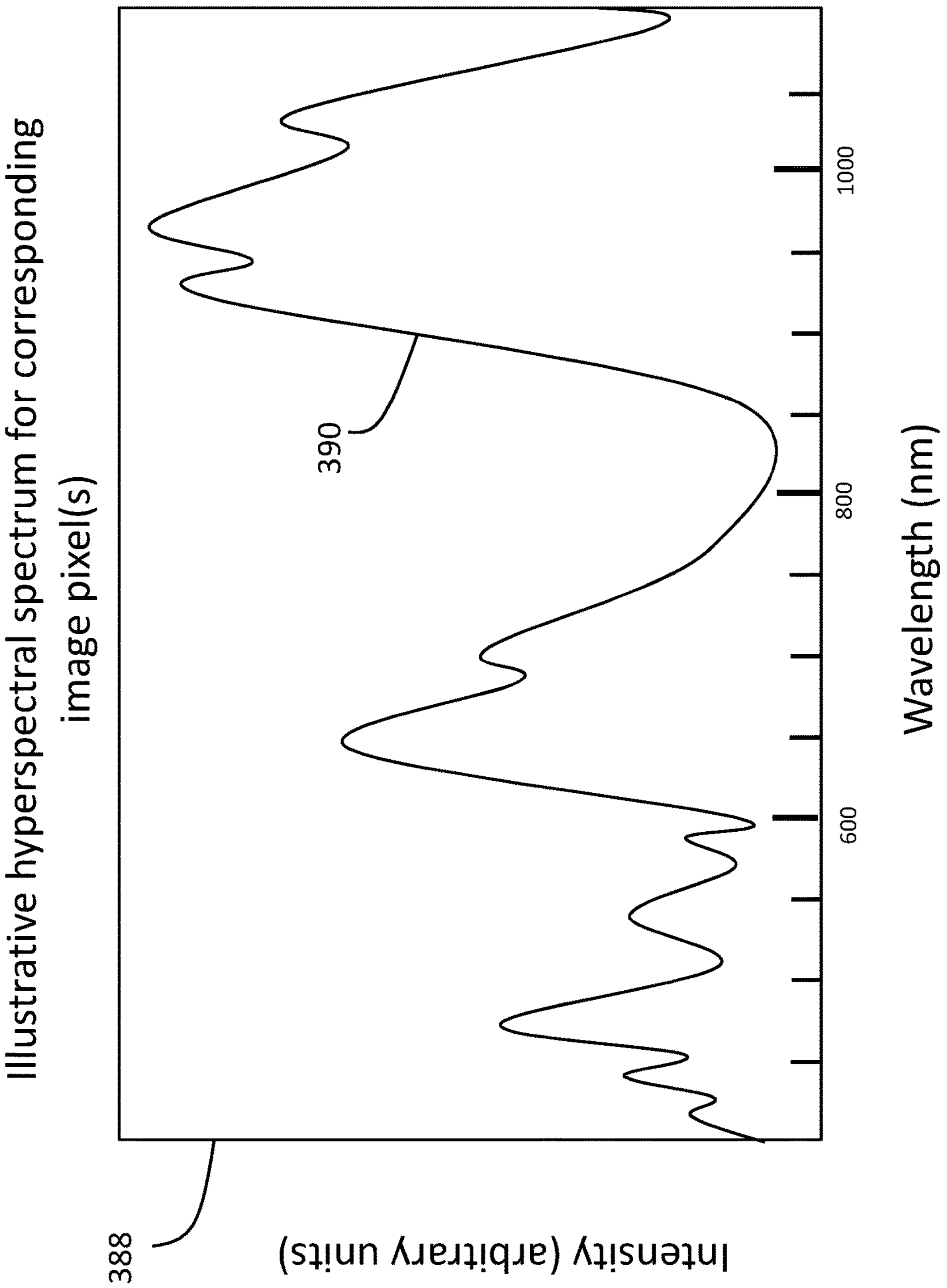
FIG. 10 shows a spectrum obtained from the image of FIG. 9 using hyperspectral imaging techniques.

FIGS. 9 and 10 schematically show how multispectral/hyperspectral imaging techniques capture spectral information of a scene. As shown in FIG. 9, an image 380 includes a scene of a vehicle 382 carrying a cargo load 384. A plurality of pixels constitutes the image 380. For purposes of illustration, a single pixel 386 of the image is shown, although the rest of the image also is made of other pixels. FIGS. 9 and 10 show how multispectral/hyperspectral imaging techniques capture spectral information 388 including spectral curve 390 for the pixel 386. Comparable spectral information for other pixels in the image 380 also would be captured. Given that a spectral signature is encoded in the spectral characteristics of taggant particles of the present invention, the present invention evaluates the captured spectral information to determine if the proper signature is present and where in the image the signature was detected.

In FIG. 10 the intensity of the spectral emissions of pixel 386 are plotted as a function of wavelength to provide spectral information 388 including spectrum 390. At each wavelength, the height of the curve indicates the intensity of detected light at that wavelength. Just as a fingerprint or signature of a person can be used to confirm the identity of that person, different taggant compounds exhibit spectral curves that are unique relative to the spectral output of other taggant compounds. The unique character of a resultant spectral code means that a spectral code can serve as a fingerprint to help identify or authenticate a particular substrate.

A typical spectral code resulting from composite characteristics of multiple spectra depend on many factors. For example, a spectral code desirably may result from a composite of features of multiple spectra of multiple taggants whose characteristics are impacted by factors including the kinds of taggant compounds, the ratios of the taggant compounds, thickness of the layers and the like. A composite signature, therefore, is more complex and more unique to make it easier to distinguish, harder to reverse engineer, able to encode more information, and/or the like. Consequently, one or more spectral characteristics of one or more corresponding taggants can be integrated to provide a composite spectral code that can be used to help identify or authenticate a particular substrate to see if it includes a proper spectral signature. For purposes of illustration, embodiments of composite spectral codes are derived from the spectral output of at least two taggants. Exemplary taggants include luminescent compounds, optical brightener compounds, IR absorbing compounds, and the like. The code provided by using a combination of compounds may be part of a library of different spectral codes that can be associated with different substrates, sources, etc.

Figure 11:
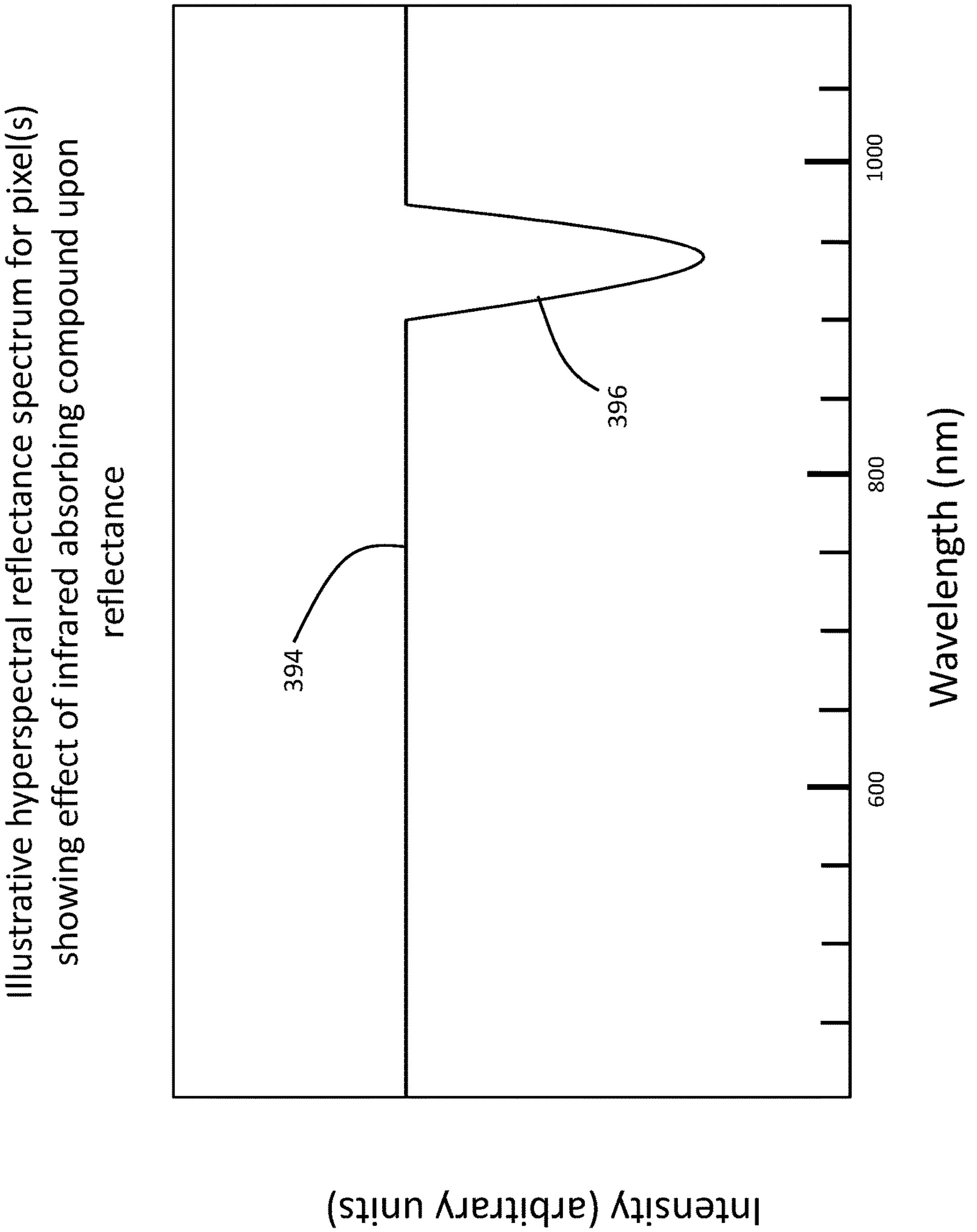
FIG. 11 shows a hyperspectral reflectance spectrum for an image pixel, or small group of image pixels, wherein the spectrum shows the effect of an infrared absorbing compound upon reflectance.

Some taggant particles of the present invention may include one or more taggants for which at least one taggant is an infrared radiation (IR) absorbing taggant. Multispectral/hyperspectral imaging can detect pixels that image such taggants by the impact of the taggant on the reflectance spectrum that is detected. An illustrative impact of an IR absorbing taggant upon reflectance intensity is shown FIG. 11. FIG. 11 shows a spectrum 394 of the intensity of reflected light as a function of wavelength. Spectrum 394 includes depression 396 in an infrared bandwidth portion. Depression 396 is a result of one or more infrared absorbing compounds absorbing incident illumination in this bandwidth portion to reduce the intensity of the reflected light in the region. In the absence of such a compound, there would be no such attenuation of spectrum 394. This effect can be incorporated into a portion of a spectral code that is based on the presence of the depression 396 or its absence. For example, a spectral code may only be authentic if one of the signature criteria is that this depression 396 is present in detected spectral data. Or, an alternative code may require that the depression be absent if, for example, one or more other specific signature features are present. An LED (or other suitable) light source that produces illumination including IR wavelengths would be suitable for evaluating if an illuminated target emits a corresponding spectral output that encodes the at least a portion of the pre-associated spectral code.

Figure 12:
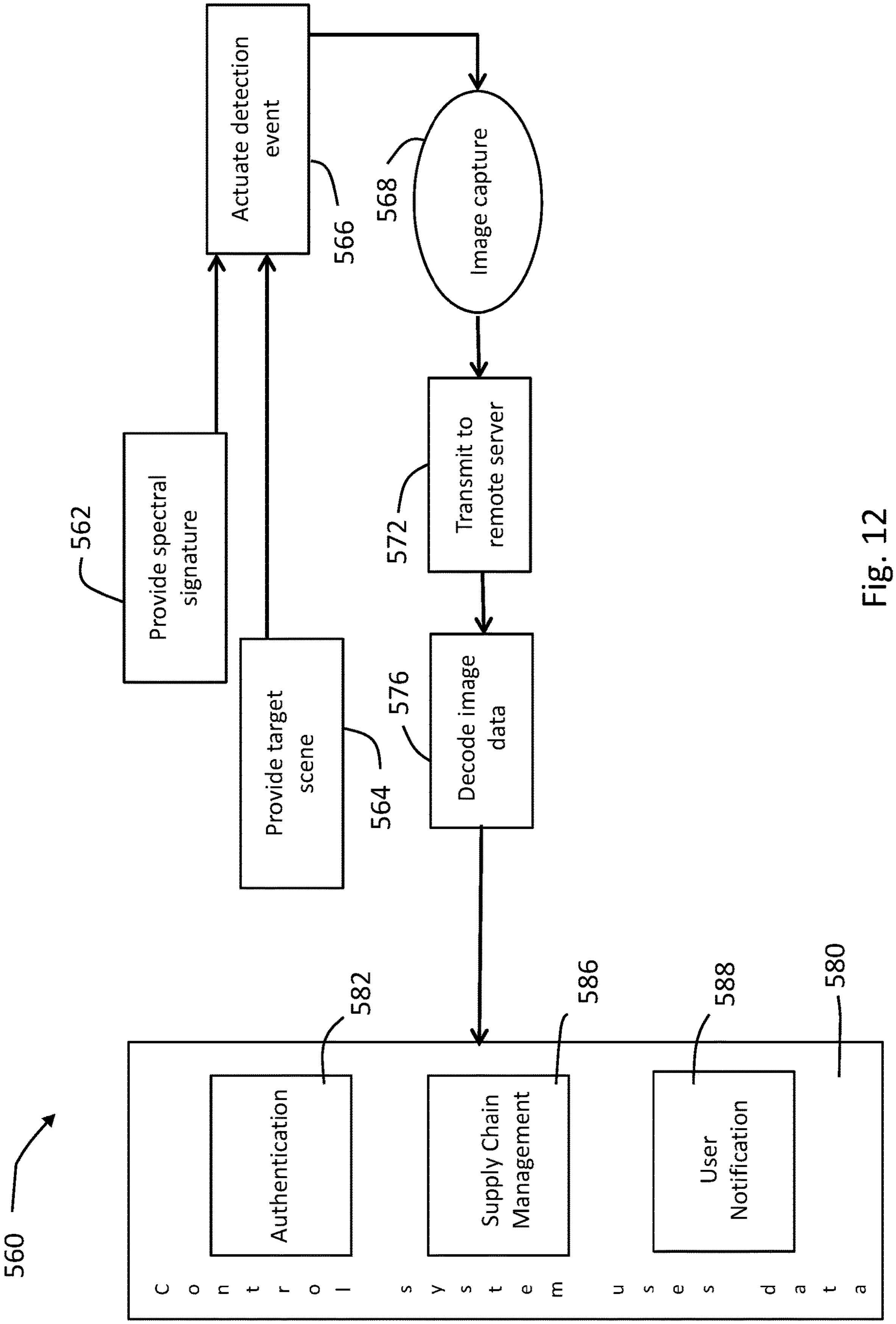
FIG. 12 schematically illustrates a method of the present invention in which hyperspectral imaging is used to detect a spectral signature in image pixels of a scene.

FIG. 12 schematically illustrates an example of a method 560 of practicing the present invention with respect to marking substrates with taggant particles of the present invention. Method 560 is integrated with data harvesting and authentication protocols in accordance with the present invention.

In the illustrated embodiment, method 560 includes step 562 in which a spectral code is provided that is pre-associated with an authentic, properly marked substrate, such as the rough diamond stones 138 of FIG. 7*a*. One goal of method 560 is to determine if substrates, such as rough diamond stones 138, incorporate the proper spectral code(s). If the stones 138 being evaluated are authentic, then the proper spectral code will be detected when spectrally read.

In step 566, a detection event is actuated. Referring to system 130 of FIG. 7*a*, this actuation would occur in that instance when control system 148 initiates data harvesting functions, authentication functions using spectral code data, and/or other functions in subsequent steps of method 560.

Method step 568 involves data harvesting by capturing a multispectral, preferably hyperspectral, image (e.g., image 170 of FIG. 7*b*) of the scene 136 under investigation. With reference to FIG. 7*a*, scene 136 optionally may be illuminated by one or more illumination sources 144 to assist image capture.

In step 572, the captured image data is transmitted to the local and/or remote components 152 and/or 154 and stored in at least one memory. For example, the resultant image data and spectral data may be stored in a memory onboard the control system 148 in local components 152 in addition to or as an alternative to storage in the remote components 154. Control system 148 may cause the captured image information to be stored in a centralized marketing database along with other data harvested from the scene 136.

Step 576 involves decoding the image data. Decoding may occur in local control system components 152 located onboard the image capture device 134. Alternatively, decoding may occur in remote control system components 154. One objective of decoding is to determine if authentic spectral signature(s) are read from one or more pixels or pixel groups of the image data. Control system 148 may further provide an output indicative of the location of such pixels or pixel groups in the captured image. Control system 148 may then provide a corresponding output 158 that includes results of the evaluation. A user and/or automated components may receive the evaluation and otherwise communicate with control system 148 via interface 160.

Control system 148 may use the decoded image data and/or other harvested data in a variety of different ways in step 580. Exemplary uses include one or more of authentication in step 582, supply chain management in step 586, and/or user notifications in step 588.

For example, as one option, the decoded spectral and/or image information can be used for authentication in step 582 to confirm that the diamond stone 138 is supplied by an authentic source and is not counterfeit or otherwise improper. Authentication may involve determining if the spectral code information resulting from image analysis includes spectral code features associated with the proper presence of the taggant particles. If the proper signature is detected, control system 148 can produce an authentication output to confirm that the imaged item is authenticated as associated with a particular source.

The data also can be used to support supply chain monitoring efforts in step 586. For this purpose, the data can be accessed by one or more entities sources in order to learn information about behavior in the chain of distribution that can assist in the analysis, planning and implementation of business plans for the development, manufacture, sale, and/or distribution of the stones 138 and products derived from these.

As an additional aspect of using the data in step 580, a further sub-step involves, the sending user notifications in step 588 based upon the decoded or other harvested information. In some embodiments the notifications include an email sent to a user's email address. The user notifications also may include a message displayed on the user interface of the apparatus.

Figure 13:
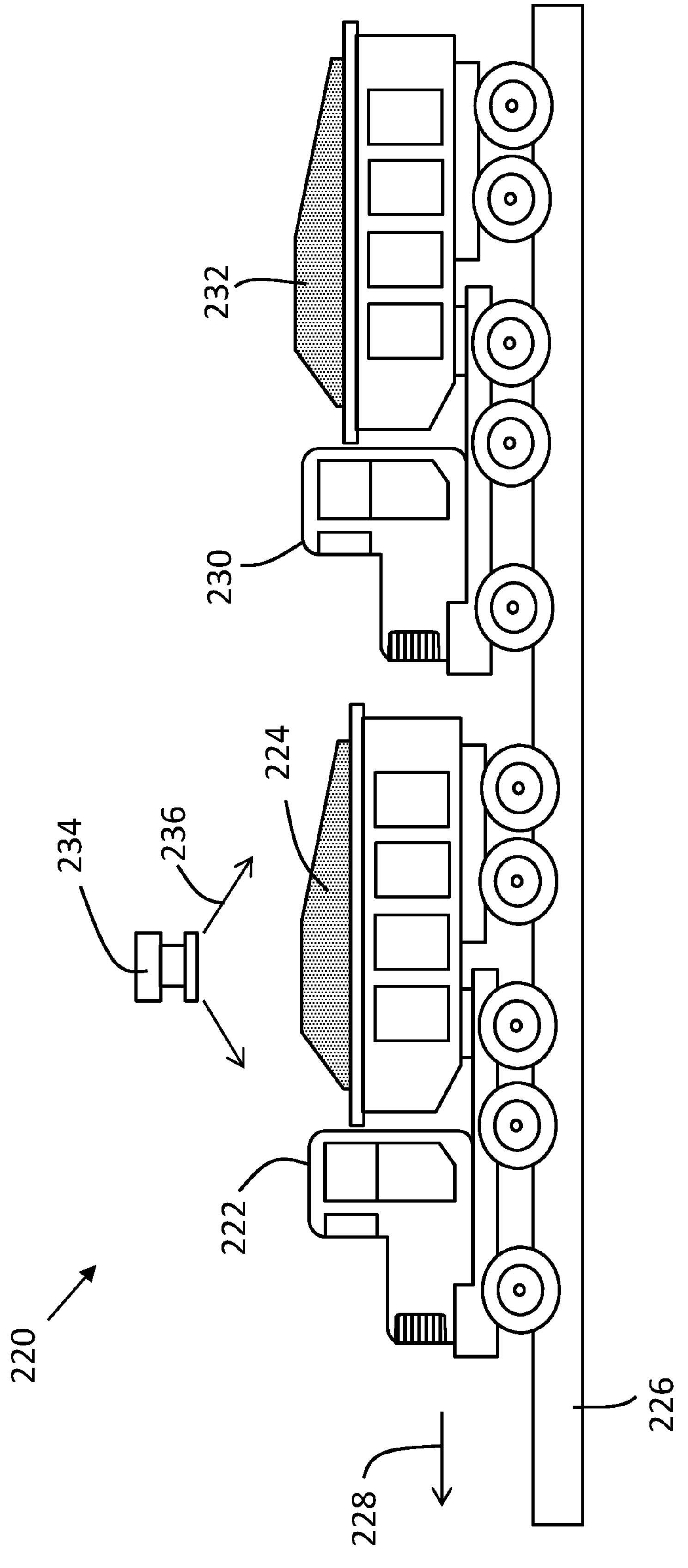
FIG. 13 shows an imaging station of the present invention that is used to determine if tampering has occurred with respect to cargo carried by cargo trucks.
Figure 14B:
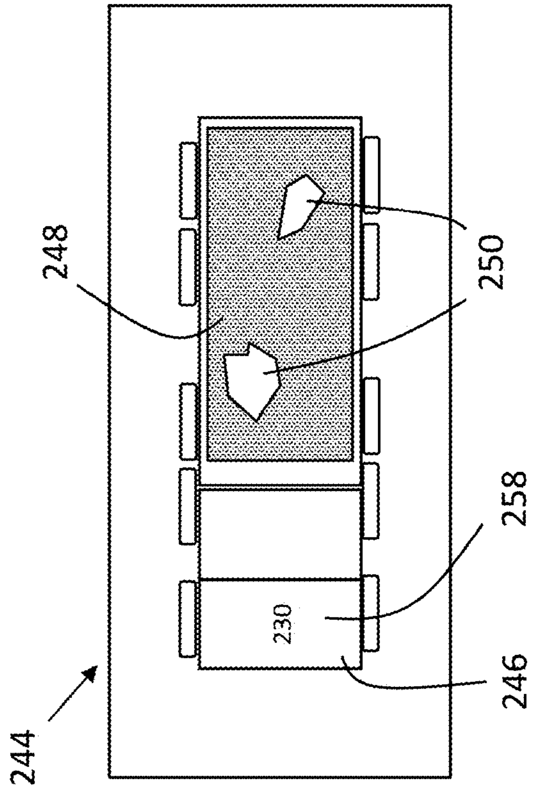
FIG. 14*b* schematically shows an image output produced by the imaging station of FIG. 13 to show portions of cargo in a second cargo truck that fail to display a proper spectral signature.
Figure 14A:
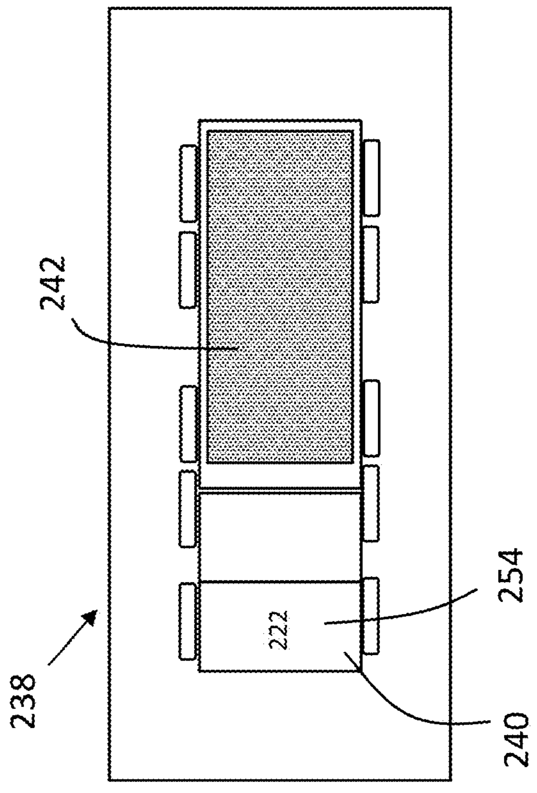
FIG. 14*a* schematically shows an image output produced by the imaging station of FIG. 13 to show portions of cargo in a first cargo truck that display a proper spectral signature.

FIGS. 13, 14*a*, and 14*b* illustrate another way in which an imaging station 220 of the present invention can be used to monitor the character of other kinds marked items. For purposes of illustration, these figures show how station 220 can be used to monitor whether tampering has occurred with respect to a cargo loads 224 and/or 232 carried by dump trucks 222 and/or 230 as the trucks move along pathway 226 of station 220. Other vehicles carrying various loads as discussed herein are also contemplated, such as railroad cars, trailers, boats or barges, wheelbarrows, airplanes, helicopters, and the like. Dump trucks 222 are used as one possible example herein and are not meant to be limiting of the present disclosure. Imaging device 234 captures visual images and multispectral, preferably hyperspectral, images of each truck 222 and 230 as each truck respectively enters the field of view 236 of the imaging device. The present illustration involves a situation in which the surfaces of the valuable cargo loads 224 and 232 have been coated with taggant particles of the present invention. Tampering would be evidenced if imaging analysis shows that undue portions of the cargo loads 224 or 232 fail to provide the proper spectral code associated with the taggant particles.

FIGS. 14*a* and 14*b* show output images 238 and 244 in which portions of the images producing the proper spectral code are highlighted with shading. FIG. 14*a* shows a truck image 240 for truck 222. In the image 238, the entire cargo area 242 is shaded. This indicates that the entire surface of the cargo area 242 produces a proper spectral code. This is evidence that no tampering occurred, because removing cargo portions would expose underlying cargo that is not marked with the taggant particles. FIG. 14*b* shows truck image 246 for truck 230. In the truck image 246, portions 250 of the cargo area 248 are not shaded. This indicates that the proper spectral code was not detected in the portions 250. This is evidence of tampering, suggesting that valuable cargo from those portions 250 have been removed, exposing underlying cargo that was not marked with taggant particles or that was otherwise covered over after the taggant particles were applied to the load. Each of the truck images 240 and 246 also show that each truck 222 and 230 was marked with identifying indicia 254 and 258, respectively, to allow individual trucks to be specifically identified using imaging techniques.

Figure 15:
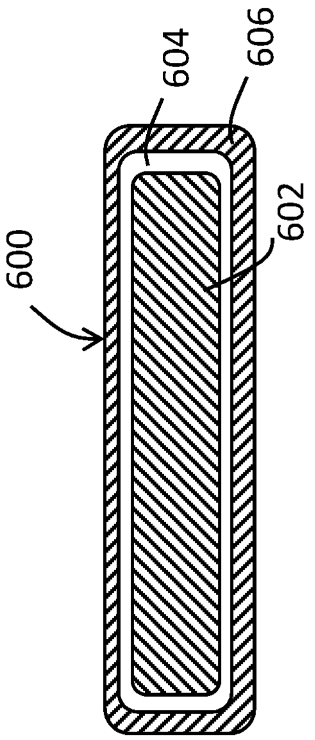
FIG. 15 shows an alternative embodiment of a taggant particle of the present invention useful to detect if a secure area has been breached.

FIG. 15 shows an alternative embodiment of a taggant particle 600 of the present invention useful to detect if a secure area has been breached. Particle 600 includes one or more multilayer taggant particles 602 of the present invention that includes at least one spectral taggant layer supported on at least one side of an opaque base layer. In some embodiments, any of the particles from FIGS. 1-6 may be used as taggant particle 602. An opaque shell 606 encapsulates the taggant particle 602. A gap 604 is between the shell 606 and the particle 602 inside. In some embodiments, shell 606 may encapsulate a plurality of taggant particles 602. Shell 606 is sufficiently frangible to break open when stepped or driven on or the like, but is sufficiently durable to remain intact until broken open by such a triggering event.

In use, taggant particle 600 can be deployed to cover a particular area, which may be in the interior of a structure or outside. If a vehicle, person, animal, or other mobile subject were to enter the area and step or press onto the particles 600, shell 606 would break open. The spectral signature of the particle 602 can now be remotely read using multispeetral imaging techniques. These transmitting particles may be detected and located in the scene. Even after the subject left the area, the fact of the entry can be detected by the signature output. The locations of the area contacted by the subject can also be pinpointed.

Figure 16:
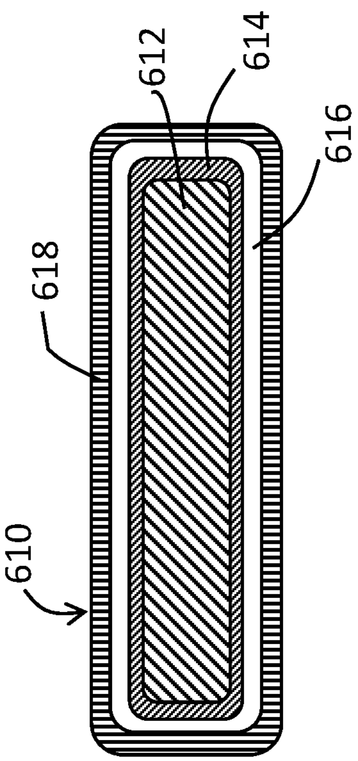
FIG. 16 shows an alternative embodiment of a taggant particle of the present invention useful to detect vehicles, people, animals, or other mobile subjects have been in a particular area.

FIG. 16 shows an alternative embodiment of a taggant particle 610 of the present invention useful to detect vehicles, people, animals, or other mobile subjects have been in a particular area. Particle 610 includes at least one multilayer taggant particle 612 of the present invention that includes at least one spectral taggant layer supported on at least one side of an opaque base layer. In some embodiments, any of the particles from FIGS. 1-6 may be used as taggant particle 612. A light transmissive, tacky adhesive 614 surrounds the core taggant particle(s) 612. An opaque shell 618 encapsulates the taggant particle 612 and adhesive 614. A gap 616 is between the shell 618 and the particle(s) 612. Shell 618 is sufficiently frangible to break open when stepped or driven on or the like but is sufficiently durable to remain intact until broken open by such a triggering event.

In use, taggant particle 610 can be deployed to cover a particular area, which may be in the interior of a structure or outside. If a vehicle, person, animal, or other mobile subject were to enter the area and step or press onto the particle 610, shell 618 would break open. The spectral signature of the particle(s) 612 can now be remotely read using multispectral imaging techniques, because the spectral output can project through the light transmissive adhesive layer 614 and the broken shell 618. Because an egress into the marked area exposes the adhesive layer 614, the broken pieces will tend to adhere to the subject that pressed onto them. Hence, the signature producing particles 612 can now be detected on the subject to which the particles 612 are adhered. This can serve as evidence that the subject entered the secure area.

Particles 600 and 610 are beneficially used together. Spectral output from particle 600 can indicate an area has been breached. Spectral output from particle 610 can help identify the subject that breached the area.

Figure 17:
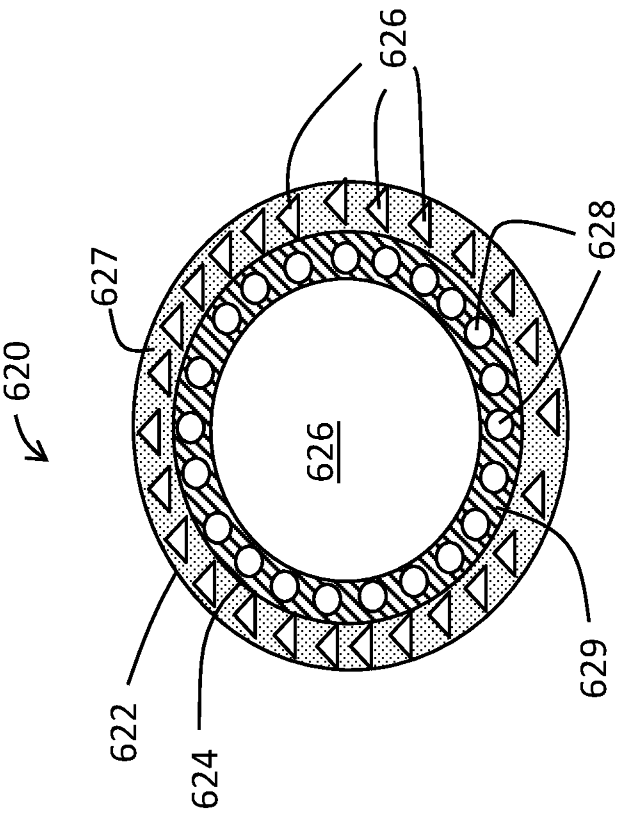
FIG. 17 shows an alternative embodiment of a taggant particle of the present invention.

FIG. 17 shows an alternative embodiment of a taggant particle 420 of the present invention with a spherical structure. Spectral taggant layers 622 and 624 encapsulate an opaque core 626. Layer 622 includes one or more taggants 626 dispersed in a light transmissive polymer matrix 627. Layer 624 includes one or more taggants 628 dispersed in a light transmissive polymer matrix 629.

The present invention will now be further described with respect to the following representative examples.

Example 1

To simulate a multilayer structure of taggant particles of the present invention, a multilayer stack (Sample 1A) containing a 2 mil spectral taggant layer over a 2 mil opaque white base layer was prepared. The opaque white layer was formed and cured from a coating composition that included 40 parts by weight of a white pigment and 35 parts by weight of rutile titanium dioxide in 25 parts by weight of a clear, uncured thermosetting melamine resin composition, wherein the resin composition was supplied as 50 to 90 weight percent solids in a solvent. The spectral taggant layer was formed and cured from a coating composition that included 0.1 parts by weight of an infrared absorbing dye evenly dispersed in 100 parts by weight of the same clear, uncured thermoset melamine resin composition. For comparison, a sample (Sample 1B) was prepared that included the same 2 mil spectral taggant layer but no opaque white layer.

The spectral properties of each of Samples 1A and 1B were tested by placing each sample over opaque white and black opacity paper to test how hyperspectral imaging can read the spectrum of the IR absorbing compound over different backgrounds. This is important, because different backgrounds can cause interference with the ability to detect a spectral signature. This approach provided four quadrants for testing:

Quadrant one simulates taggant particles with an opaque white base layer (Sample 1A) over a dark background, Quadrant two simulates taggant particles with an opaque white base layer (Sample 1A) over a light background, Quadrant three simulates taggant particles without an opaque white base layer (Sample 1B) over a dark background, and Quadrant four simulates taggant particles without a center white layer (Sample 1B) over a light background.

Hyperspectral imaging was used to detect the spectrum of each sample in each of the four quadrants. Quadrants one and two for Sample 1A showed substantially similar spectra despite the extreme varying degree of the white and black backgrounds. The results for Quadrants one and two show that with a white center layer background color interference has a minimal effect on particle spectra. In this and all other examples, a SPECIM FX Series hyperspectral camera was used to capture hyperspectral images unless expressly noted otherwise.

Quadrants three and four for Sample 1B showed very different spectra with the extreme varying degree of background. Quadrant 3 had no detectible spectral signature as the black background caused too much interference and absorbed nearly all the illumination light. Quadrant four provided a good, detectible spectral signature. The results for Quadrants three and four show that background interference can be extreme when taggant particles fail to include an opaque base color layer under a spectral taggant layer. This shows that taggant particles without an opaque base layer will be vulnerable to circumstances in which the spectral producing compound is present but not detectible with hyperspectral or multispectral imaging techniques. In contrast, the presence of an opaque base layer allows these techniques to detect a signature in a wider range of background conditions.

Example 2

This example shows how to empirically identify a suitable loading of taggant particles in a spectral taggant layer. To simulate various loadings of a spectral taggant in the spectral taggant layer of taggant particles, an infrared absorbing dye was added to a clear UV curable ink to simulate deployment in a clear thermoset resin that would be used in actual taggant particles. The infrared absorbing dye was added into coated samples, respectively at the following loadings by weight: 10, 5, 2.5, 1.25, 0.625, 0.3125, 0.156, 0.1, 0.078, 0.039, 0.02, and 0.01 parts by weight of dye per 100 parts by weight of the ink compositions to which the dye was added (the UV curable ink compositions were 100% solids and included no solvent) The ink samples were applied in a thin layer using a cotton swab over cardstock and cured via a high intensity, 100 watt UV curing lamp.

Spectra were taken of the samples using hyperspectral imaging techniques. It was seen that dye spectra were easily distinguishable from the spectra of the control coating with no dye present. Dye 1 spectra used as taggant can be seen in the bottom spectra of FIG. 1*b*-2. Dye spectra included two peaks at roughly 720 nm and 820 nm. This test also allowed an approximate loading of the infrared absorbing dye to be determined based on the resultant spectral signature following a hyperspectral image capture. It was found that samples including a loading around 0.1 and 0.15 parts by weight of the dye provided good spectral signatures for later use in the layered particles. These loadings were considered good because the spectral dye created a signature that absorbed 40-90% of the incident light. At higher loadings of dye, nearly all of the incident light was absorbed. This rendered a signature that was undetectable, as it created a flat line (similar to an all-black background or black body absorber). The results of this evaluation were used to select the IR dye loading used in Example 1.

Example 3

To simulate how a reflective base layer impacts a spectral signature of a multilayer structure of taggant particles of the present invention, a multilayer stack (Sample 3A) containing a 2 mil spectral taggant layer over a reflective, 2 mil aluminized base layer was prepared. The aluminized base layer was formed and cured from a coating composition that included 20 parts by weight of 5 nm aluminum particles in 75 parts by weight of a clear, uncured, thermoset melamine resin composition, wherein the resin composition was supplied as 50 to 90 weight percent solids in a solvent. The spectral taggant layer was formed and cured from a coating composition that included 0.1 parts by weight of an infrared absorbing dye evenly dispersed in 100 parts by weight of the same, clear, uncured thermoset melamine resin. For comparison, a comparison sample (Sample 3B) was prepared that included the same 2 mil spectral taggant layer but no aluminized base layer.

The spectral properties of each of Samples 3A and 3B were tested by placing each sample over black and white opacity paper to test how hyperspectral imaging can read the spectrum of the IR absorbing compound over different backgrounds. This approach provided four quadrants for testing:

Quadrant one simulates taggant particles with a reflective base layer (Sample 3A) over a dark background, Quadrant three simulates taggant particles with a reflective base layer (Sample 3A) over a light background, Quadrant two simulates taggant particles without a base layer (Sample 3B) over a dark background, and Quadrant four simulates taggant particles without a base layer (Sample 3B) over a light background.

Hyperspectral imaging was used to take spectra from each of the four quadrants. Quadrants one and three have similar spectra that are in a tight range relative to one another. Even though the spectra are similar to each other due to the presence of the opaque, aluminum nanoparticle layer, the spectral signal is weak. It is believed that the high reflectivity of the aluminum surface interferes with the spectral signal. Consequently, although such a reflective layer helps to mitigate the effects that changing the background might have on reading a spectral signature, such a construction would not be the best choice to use when a stronger signal is needed, such as to be able to read the signature remotely from a greater distance or under less favorable illumination.

Quadrants two and four provided spectra that were very different from one another. Quadrant four shows an example of a good detectible spectra signature provided when a spectral taggant layer is provided over a solid, white background. Quadrant 2 has no detectible spectral signature, as the black background caused too much interference and absorbed nearly all the illumination light.

These results show that a reflective, aluminum nanoparticle layer creates a tight spectral signature over a wide range of backgrounds but also causes a decrease in the detectible spectral signature.

Example 4

To further evaluate the impact of a reflective base layer, the procedure of Example 3 was repeated except the reflective base layer was prepared by spraying two coats of Rustoleum brand metallic grey spray paint onto white and black opacity paper (Sample 4A). The spectral taggant layer was formed and cured over the reflective layer from a coating composition containing 0.1 parts by weight of an infrared absorbing dye in 100 parts by weight of a clear uncured thermoset resin composition, wherein the resin composition was supplied as 50 to 90 weight percent solids in a solvent. The comparison sample (Sample 4B) included only the spectral taggant layer.

This provided four quadrants for testing:

Quadrant one simulates particles without a reflective center layer (Sample 4B) placed over a light background, Quadrant two simulates particles without a reflective center layer (Sample 4B) placed over a dark background, Quadrant three simulates particles with a reflective center layer (Sample 4A) placed over a light background, and Quadrant four simulates particles with a reflective center layer (Sample 4A) placed over a dark background.

Hyperspectral imaging was used to take spectra from each of the four quadrants. Quadrants three and four had similar spectra that are in a tight range relative to one another. Quadrants one and two had spectra that are very different from one another. In quadrants three and four the spectra were similar to each other due to the reflective grey spray paint layer but had a very weak taggant spectrum. Although the base layer provides a consistent signal over two different backgrounds, the reflectivity of the base layer significantly decreases the spectral signature signal.

Quadrant one showed an example of a good detectible spectral signature. Quadrant two had no detectible spectral signature as the black background caused too much interference and absorbed nearly all the illumination light.

These results show that a reflective grey layer creates a tight spectral signature over a wide range of backgrounds but also causes a decrease in the signal strength of the spectral signature.

Example 5

Two-sided taggant particles of the present invention were prepared using spectral taggant layers that included individual dyes (Dye 1 or Dye 2, respectively) and combinations of dyes (both Dyes 1 and 2).

Sample 5A included two spectral taggant layers on each major face of an opaque base layer incorporating two opaque white sub-layers. Each opaque white sub-layer was formed and cured from a coating composition, which included 40 parts by weight of white pigment and 35 parts by weight rutile $TiO_2$ dispersed in 25 parts by weight of a thermosetting, clear melamine resin composition, wherein the resin composition was supplied as 50 to 90 weight percent solids in a solvent. On each major face, one of the spectral taggant layers was formed and cured from a coating composition that included 0.15 parts by weight of Dye 1 in 100 parts by weight of an uncured, clear, thermoset melamine resin (80% solids in a solvent), and a second taggant layer was formed and cured from a coating composition that included 0.2 parts by weight of Dye 2 in 100 parts by weight of the same uncured, resin composition.

Sample 5B was prepared in the same way except that two layers of spectral taggant layer including Dye 2 were formed on each major face of the opaque base layer.

Sample 5C was prepared in the same way except that two layers of the spectral taggant layer including Dye 1 were formed on each major face of the opaque base layer.

Samples 5A, 5B, and 5C all had a final structure thickness of about 100 microns.

Hyperspectral imaging was used to evaluate the spectral output of the samples. Zones A, B, and C were identified in the field of view of the camera. Samples 5A, 5B, and 5C were placed into these zones, respectively.

When the system was programmed to Dye 1 the system identified and located Sample 5C in zone C. When the system was programmed to Dye 2, the system identified and located Sample 5B in zone B. When the system was programed to identify the composite spectral signature provided by the mixture of Dyes 5A and 5B, Sample 5A was identified and located in Zone A. The blend of Dyes 1 and 2 creates a composite signature unique and separate from the respective spectral signatures of Dyes 1 and 2 individually.

If the signature definition for the composite signature of Sample 5A is less strict, the system will identify and located the signature for Dye 1 in Zone A even though Zone A is intended to be the composite signature. This mis-identification is caused by the acceptable signature range being too far open for the spectral signatures. This shows that the spectral signature tolerance can impact detection accuracy. The risk of false positives is greater when signature tolerances are defined too loosely. To avoid this, a system can be programmed only to accept a spectral signature according to stricter tolerances. As another example of mis-identification, a marker was used to make a mark in Zone D of the field of view. When programmed too loosely to recognize the signature for Dye 2, the system falsely identifies the mark as Dye 2. This mis-identification is easily fixed by making the signature tolerances stricter.

Example 6

Two-sided taggant particles of the present invention were prepared using spectral taggant layers that included Dye 1 as described for Sample 5C except that the particles were formed in two different sizes. Sample 6A particles were screened to obtain particles with a width of about 300 to 1200 microns and a height of 100 microns. Sample 6B particles were screened to provide particles with a width in the range from 75 microns to 300 microns and a height of 100 microns.

Hyperspectral imaging was used to evaluate the spectral output of the samples. Zones A and B were identified in the field of view of the camera. Samples 6A and 6B were dispersed in sand, respectively, and the resultant sand mixtures were placed into Zones A and B, respectively. When the system was programmed to recognize the spectral signature of Dye 1, the system was able to identify and locate the taggant particles in both Zones A and B. This shows that the system can recognize taggant particles when the taggants are different sizes.

Example 7

The procedure of Example 6 was followed except that sand was placed into each of Zones A, B, and C. No taggant particles were used. When the system was programmed to detect and locate Dye 1, Dye 2, or the combination of Dye 1 and 2, no signatures were detected in any of the Zones. This confirms that the system is able to avoid false positives when the taggants are not present.

Example 8

The procedure of Example 5 was used except that each of the samples was screened to provide one set of taggant particles with a width of 300 microns to 1200 microns and another set with a width of 75 microns to 300 microns. Further, both sizes of each kind of taggant particle were mixed with sand. Samples with Dye 1 were placed into Zone A, samples with Dye 2 were placed into Zone B, and samples with both Dyes 1 and 2 were placed into Zone 3. When appropriately programmed, the system properly particles in each of the three zones.

Example 9

Samples 6A and 6B were used to prepare a coating admixture. 0.5 parts by weight of each of the two particle sizes were combined and dispersed at a total of 1 part by weight in 100 parts by weight of a UV curable, clear resin (100% solids with no solvent) to provide a coating composition. For a comparison, the same infrared absorbing dye was dispersed at 0.1 parts by weight in 100 parts by weight of the same UV curable, clear resin composition. Note from above that each of Samples 6A and 6B used 0.15 parts by weight of dye in 100 parts by weight of matrix material to provide the taggant particles.

A rough stone was dipped into the coating admixture containing the taggant particles. The coated stone was placed under a 100 watt UV light in order to cure the coating. Spectra were taken at 4 different locations on the coated stone. The SPECIM IQ camera was used to image the stones. Spectra of 4 pixels at different locations on the coated stone were evaluated.

A rough stone was dipped into the admixture containing the dispersed dye (no taggant particles). This coated stone also was placed under a 100 watt UV light in order to cure the coating. Spectra were taken at 4 different locations on the stone and evaluated.

All four spectra from the stone coated with the taggant particles dispersed in the coating admixture were very uniform relative to one another. Spectra from the stone coated with merely the dye dispersed in the coating admixture varied significantly relative to one another.

Differences in spectra uniformity among the two kinds of coated stones are due to background interference. When taggant particles are used, the impact of background noise is significantly reduced to allow similar spectra to be obtained from many locations on the stone. In contrast, when only the dye is used, the variation of the stone surface has a significant impact on the spectra.

Consequently, when using taggant particles of the present invention, the uniformity in spectral signature is a significant factor when programing the system to recognize and identify spectral signatures. The more uniform the target material spectra are to one another, the tighter the threshold that can be set for identifying that signature. A tighter threshold directly relates to the difficulty in counterfeiting the spectral signature system. In contrast, a system that has a wider range of accepted signature features is more vulnerable to outputting false positives. This makes it easier for counterfeiters to create spectral signatures that will be able to fool the system by false positives. A significant advantage of the taggant particles of the present invention, therefore, is that the ability to implement detection with tighter signature tolerances makes the signatures more secure, more reliable, and harder to counterfeit.

Another advantage the particles provide relates to the amount of spectral taggant that is used to tag a substrate such as the rough stones used in this example. Even though the taggant particles were loaded at 1 weight percent in, and the dye on its own in the other coating admixture was loaded at 0.1 weight percent, much less dye is required when tagging with the particles as the taggant only shows up in small zones in the individual particles versus the taggant lacquer, which envelops the entire stone. Note, too, that the taggant is only a fraction of the total weight of the taggant particles, so the actual loading of taggant on a weight basis is much less than the 1 weight percent loading of the taggant particles. The smaller amount of taggant is advantageous not only from a cost perspective but also from a security stand point. To reverse engineer a product coated in the particle lacquer coating could require thousands of particles in order to have enough taggant material to evaluate. Even if the counterfeiter could obtain enough particles to study, the taggants in those particles are locked into a polymer matrix. This makes it very difficult to extract a sufficient amount of taggant to be able to identify what taggant is used. For example, for taggants particularly in the form of organic dyes, the chemicals and/or process conditions used to access the taggants from the matrix could tend to destroy, break down, or otherwise change a dye so much that the dye is no longer present to evaluate. In practical effect, the access efforts cause the dye to self-destruct into by-products or other remnants. In many embodiments, at least a portion of the taggants used in the taggant particles are organic dyes in order to provide this kind of "self-destruct" protection against counterfeiters.

Example 10

This example shows how infrared radiation (IR) absorbing dyes and IR transparent pigments are a synergistic pair in the context of using hyperspectral imaging to detect spectral signatures in a scene. The IR transparent pigments are colored to help hide or camouflage that the infrared absorbing dye is even present. Yet, hyperspectral imaging still is easily able to detect the IR absorbing dye due to the IR transparency of the pigment. The synergistic pair can be used as at least a portion of the ingredients incorporated into a polymer matrix of a spectral taggant layer to provide so-called covert taggant particles.

To simulate the multilayer structure of a taggant particle of the present invention, an IR absorbing dye was dispersed at 0.1 parts by weight into 100 parts by weight of a solvent-based composition including a clear, dispersed thermosetting melamine resin. An IR transparent, black pigment also was dispersed at 5 parts by weight per 100 parts by weight of the resin composition. The black pigment was added to change the color of the particles and camouflage them to more closely match a black background. Traditionally, it is difficult to read a spectral signature from taggants in a black coating, because the black color tends to absorb the illumination or spectral output to a point where the spectral signature cannot be detected. Using an IR transparent black pigment avoids this problem.

The coating mixture was used to form a black, 2 mil coating (note that 1 mil is 0.001 inches or 0.0254 mm). A hyperspectral camera was used to capture an image of the black coating. Even though the coating was solid black to the unaided eye, hyperspectral imaging techniques were still able to detect a strong spectral signal from the IR absorbing dye hidden in the black pigment.

This result shows that camouflaging of particles while still maintaining a good detectible spectral signature is possible in the practice of the present invention. This same strategy can be used to create a variety of colored particles used to camouflage particles into a wide range of backgrounds.

All patents, patent applications, and publications cited herein are incorporated herein by reference in their respective entities for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A multilayer, taggant platelet particle, comprising:

a) an opaque base layer comprising first and second opposed major faces; and b) at least a first spectral taggant layer provided on at least one of the first and second opposed major faces, wherein the first spectral taggant layer comprises one or more luminescent taggant compounds dispersed in a light transmissive matrix, wherein in response to incident light the one or more luminescent taggant compounds exhibit a luminescent emission comprising spectral characteristics associated with a spectral signature;

wherein the opaque base layer provides a solid background against which the spectral signature is produced and read; and wherein the first spectral taggant layer includes 1 weight percent to 70 weight percent of the one or more luminescent taggant compounds based on the total weight of the first spectral taggant layer not including any solvent.

2. The multilayer, taggant platelet of claim 1, wherein the multilayer, taggant platelet comprises opposed major faces and a side that interconnects the major faces around the perimeter of the faces.

3. The multilayer, taggant platelet of claim 2, wherein the opposed major faces are parallel to each other.

4. The multilayer, taggant platelet of claim 2, wherein the perimeter of the multilayer, taggant platelet is irregular.

5. The multilayer, taggant platelet of claim 1, wherein the spectral signature is a multispectral signature detectable from a distance.

6. The multilayer, taggant platelet of claim 1, wherein the spectral signature is a hyperspectral signature detectable from a distance.

7. The multilayer, taggant platelet of claim 1, wherein the polymer matrix is optically clear.

8. The multilayer, taggant platelet of claim 1, wherein the polymer matrix is tinted.

9. The multilayer, taggant platelet of claim 1, wherein the first spectral taggant layer comprises a plurality of different luminescent taggant compounds.

10. The multilayer, taggant platelet of claim 9, wherein the plurality of luminescent taggant compounds exhibits spectrally interactive characteristics associated with a composite spectral signature.

11. The multilayer, taggant platelet of claim 10, wherein three or more luminescent taggant compounds provide the spectrally interactive characteristics.

12. The multilayer taggant platelet of claim 1, wherein the first spectral taggant layer is incorporated into a multilayer stack comprising multiple spectral taggant layers, wherein each spectral taggant layer of the stack comprises one or more luminescent taggant compounds dispersed in a light transmissive matrix.

13. The multilayer, taggant platelet of claim 12, wherein the multilayer stack exhibits spectral characteristics associated with different spectral signatures.

14. The multilayer, platelet of claim 1, wherein the first spectral taggant layer is provided on the first major face of the opaque base layer, and wherein the multilayer, taggant platelet further comprises at least a second spectral taggant layer on the second major face of the opaque base layer, wherein the second spectral taggant layer comprises one or more luminescent taggant compounds dispersed in a light transmissive matrix, wherein the one or more luminescent taggant compounds of the second spectral taggant layer exhibit luminescent spectral characteristics associated with a spectral signature.

15. The multilayer, taggant platelet of claim 14, wherein the spectral signature associated with the second spectral taggant layer is different than the spectral signature associated with the first spectral taggant layer.

16. The multilayer, taggant platelet of claim 1, wherein the opaque base layer comprises two opaque sub-layers.

17. The multilayer, taggant platelet of claim 1, wherein the opaque base layer presents a single, neutral color.

18. The multilayer, taggant platelet of claim 17, wherein the neutral color is grey.

19. The multilayer, taggant platelet of claim 17, wherein the neutral color is white.

20. The multilayer, taggant platelet of claim 1, further comprising a light transmissive, tinted layer provided on or both sides of the multilayer, taggant platelet.

21. The multilayer, taggant platelet of claim 20, wherein the multilayer, taggant platelet comprises a light transmissive, tinted layer on both sides of the multilayer, taggant platelet.

22. The multilayer, taggant platelet of claim 21, wherein the tinted layer on one or both sides provides a tinted effect that is visible to the unaided human eye under ultraviolet or infrared illumination.

23. The multilayer, taggant platelet of claim 1, wherein the opaque base layer comprises relatively coarse and relatively fine particles.

24. The multilayer, taggant platelet of claim 23, wherein each of the relatively coarse and relatively fine particles comprises titanium dioxide particles.

25. The multilayer, taggant platelet of claim 1, wherein the opaque base layer comprises titanium dioxide particles dispersed in a polymer matrix, said opaque base layer comprising 35 to 70 parts by weight of the titanium dioxide particles per 50 to 100 parts by weight of the polymer matrix.

26. The multilayer, taggant platelet of claim 1, wherein the first spectral taggant layer comprises 10 to 55 weight percent of the one or more luminescent taggant compounds based on the total weight of the first spectral taggant layer not including any solvent.

27. The multilayer, taggant platelet of claim 1, wherein the multilayer, taggant platelet and has a width to height ratio of at least 2:1.

28. The multilayer, taggant platelet of claim 27, wherein the width to height ratio is in the range from at least 2:1 to 20:1 or less.

29. The multilayer, taggant platelet of claim 28, wherein the multilayer, taggant platelet has a height in the range from 10 microns to 150 microns.

30. The multilayer, taggant platelet of claim 28, wherein the multilayer, taggant platelet has a width in the range from 30 microns to 300 microns.

31. The multilayer, taggant platelet of claim 1, wherein the first spectral taggant layer further comprises an optical brightener compound.

32. The multilayer, taggant platelet of claim 1, wherein the first spectral taggant layer further comprises an IR absorbing compound.

33. The multilayer, taggant platelet of claim 1, wherein the first spectral taggant layer further comprises an IR reflecting compound.

34. The multilayer, taggant platelet of claim 1, wherein the first spectral taggant layer further comprises an ultraviolet absorbing compound.

35. The multilayer, taggant platelet of claim 1, wherein the first spectral taggant layer further comprises an ultraviolet reflecting compound.

36. The multilayer, taggant platelet of claim 1, wherein the spectral taggant layer comprises more than one luminescent taggant compound that interact according to fluorescence resonance energy transfer.

* * * * *